(12) United States Patent
Carter

(10) Patent No.: US 6,283,220 B1
(45) Date of Patent: Sep. 4, 2001

(54) REMOTE CONTROL VEHICLE

(75) Inventor: Mark David Carter, Stoke-on-Trent (GB)

(73) Assignee: J.C. Bamford Excavators Limited, Rocester (GB)

( * ) Notice: Subject to any disclaimer, the term of this patent is extended or adjusted under 35 U.S.C. 154(b) by 0 days.

(21) Appl. No.: 09/458,781

(22) Filed: Dec. 10, 1999

(30) Foreign Application Priority Data

Dec. 10, 1998 (GB) .................................................. 9827204

(51) Int. Cl.⁷ .................................................. A62C 27/00
(52) U.S. Cl. .............................. 169/24; 169/52; 180/6.48; 414/685; 901/1
(58) Field of Search ........................ 169/24, 52; 180/6.48, 180/308, 167; 414/685, 729, 686; 901/1, 43

(56) References Cited

U.S. PATENT DOCUMENTS

| | | | |
|---|---|---|---|
| 3,155,319 | * | 11/1964 | Hammelmann .......................... 169/24 |
| 3,762,478 | * | 10/1973 | Cummins ................................ 169/24 |
| 3,768,367 | * | 10/1973 | Fuzzell ................................... 91/361 |
| 4,040,500 | | 8/1977 | Blakeslee . |
| 4,108,269 | | 8/1978 | Nakao . |
| 4,482,960 | | 11/1984 | Pryor . |
| 4,709,265 | | 11/1987 | Silverman et al. . |
| 5,240,366 | * | 8/1993 | Bamford ................................ 414/686 |
| 5,377,913 | * | 1/1995 | Van Der Woude .................... 239/227 |
| 5,518,359 | * | 5/1996 | Pratt ..................................... 414/729 |
| 5,971,320 | * | 10/1999 | Jermyn et al. ..................... 244/17.25 |
| 6,113,343 | * | 9/2000 | Goldenberg et al. ................ 414/729 |

FOREIGN PATENT DOCUMENTS

2329166 A 3/1999 (GB) .

* cited by examiner

Primary Examiner—David A. Scherbel
Assistant Examiner—Dinh Q. Nguyen
(74) Attorney, Agent, or Firm—Marshall, O'Toole, Gerstein, Murray & Borun

(57) ABSTRACT

A remote control vehicle comprising a body having a front end and a rear end and provided with first and second ground engageable propulsion means respectively disposed on opposite sides of the vehicle and in which the first and second propulsion means are driven by first and second transmission means respectively to permit the vehicle to be propelled and steered by driving the propulsion means on one side of the vehicle independently from the propulsion means on the other side of the vehicle, a boom assembly having carrying means for carrying an implement on the boom assembly, the boom assembly being mounted on the body for lifting movement between a raised position and a lowered position by a lifting means and wherein the ground engageable propulsion means and the lifting means of the boom assembly are operable by a receiver, of an electromagnetic signal, provided on the body.

37 Claims, 16 Drawing Sheets

REMOTE CONTROL VEHICLE

BACKGROUND TO THE INVENTION

This invention relates to a remote control vehicle.

SUMMARY OF THE INVENTION

An object of the invention is to provide a remote control vehicle which is particularly suitable for use in confined spaces and in a hostile environment.

According to the invention we provide a remote control vehicle comprising a body having a front end and a rear end and provided with first and second ground engageable propulsion means respectively disposed on opposite sides of the vehicle and in which the first and second propulsion means are driven by first and second transmission means respectively to permit the vehicle to be propelled and steered by driving the propulsion means on one side of the vehicle independently from the propulsion means on the other side of the vehicle, a boom assembly having carrying means for carrying an implement on the boom assembly, the boom assembly being mounted on the body for lifting movement between a raised position and a lowered position by a lifting means and wherein the ground engageable propulsion means and the lifting means of the boom assembly are operable by a receiver, of an electromagnetic signal, provided on the body.

The electromagnetic signal may be transmitted for reception by the receiver by a transmitter disposed at a location remote from said vehicle.

Each transmission means may comprise a hydrostatic motor driven by a respective hydrostatic pump, the output of each pump being controlled by an electrical signal supplied by said receiver in response to said electromagnetic signal.

Each pump may be provided with at least one hydraulic servo mechanism for adjustment of the output of said pump, the servo mechanism being operable by said electrical signal.

The or each servo mechanism may comprise an electrically operable valve which is operated by said electrical signal.

The servo mechanism may comprise at least one hydraulically operated motor means to adjust the output of said pump.

Each pump may be a swash plate pump and the angle of the swash plate may be adjustable by said electrical signal.

The angle of the swash plate may be adjustable by said hydraulically operated motor means of the pump.

The lifting means of the boom assembly may comprise a first motor means disposed between the boom and the body, supply of fluid to the first motor means being controlled by an electrical signal supplied by said receiver in response to said electromagnetic signal.

The implement may be movable relative to the boom assembly by a second hydraulic motor means.

The second hydraulic motor means may comprise a crowd ram connected between the boom assembly and the carrying means for pivotal movement of the carrying means relative to the boom assembly.

Supply of fluid to the second motor means may be controlled by an electrical signal supplied by said receiver in response to said electromagnetic signal.

Supply of fluid to the first and/or second motor means may be controlled by an electrically operable valve which is operated by a respective electrical signal.

The vehicle may be provided with a first auxiliary device operable by a third motor means.

Supply of fluid to third motor means may be controlled by an electrical signal supplied by said receiver in response to said electromagnetic signal.

The vehicle may be provided with a second auxiliary device operable by a fourth motor means.

Supply of fluid to the fourth motor means may be controlled by an electrical signal supplied by said receiver in response to said electromagnetic signal.

Supply of fluid to the third and/or fourth motor means may be controlled by third and/or fourth electrically operable valves which are operable by said electrical signal.

The or each electrically operable valve may be a valve in which supply of hydraulic fluid is controlled by a proportional solenoid.

The or each electrically operable valve may supply hydraulic fluid to a hydraulically operated valve which is adapted to be operated to supply hydraulic fluid to an associated motor.

At least one of the first, second, third or fourth motor means may comprise a hydraulic ram having a piston movable in cylinder and operable as a result of said supply of hydraulic fluid thereto.

The or each electrically operable valve may be supplied with hydraulic fluid from a manifold The or each electrically operable valve and/or the manifold and/or the receiver and/or the or each hydraulically operated valve may be disposed in a control compartment of the vehicle which is disposed within a housing.

The control compartment may be enclosed by metal walls, roof and floor with appropriate connection therethrough for components disposed within the control compartment.

The vehicle may have means to dispense water or other fire fighting medium therefrom.

Said means may comprise a nozzle or the like to provide a jet of water or the like for said medium which may be controlled by an electrical signal supplied by said receiver in response to said electromagnetic signal.

The vehicle may have a reservoir to contain water or said other fire fighting medium for dispensing by said dispensing means.

The vehicle may have a pump or the like to feed water or said other medium from the reservoir to be dispensed from said dispensing means under pressure.

The nozzle and/or the reservoir and/or the pump may be provided as an implement comprising fire fighting attachment to be carried by said boom assembly.

Said fire fighting attachment may be carried by said carrying means.

The vehicle may be unprovided with an operator's seat and/or operator controls for propelling and steering the vehicle and/or lifting movement of the boom assembly and/or operation of the first and/or second auxiliary device.

The vehicle may be provided with metal conduits, such as steel conduits, for containing electrical wiring such as for auxiliary electrical connections and two emergency stop switches.

Hydraulic fluid may be supplied to at least one of the first, second, third or fourth motor means through at least one flexible hose and the flexible hose may be encased in a fire resistant means.

The boom assembly may have said carrying means at an outer end thereof and an inner end of the boom assembly may be mounted on the body at or adjacent the rear end of the body.

In said lowered position the boom assembly may extend forwards from said inner end so that the implement is disposed forward of the front end of the body.

The boom assembly may be disposed on one side of a longitudinal axis of the vehicle which axis is disposed midway between said first and second ground engageable propulsion means.

The boom arm assembly may have an implement carrying member which projects from the outer end of the lift arm assembly and extends transversely of the body and has said implement carried thereon.

The ground engageable propulsion means may comprise wheels.

The wheels may be provided with tires which do not rely on gaseous inflation.

The first auxiliary device may comprise a clamping means operable to hold a load on said implement.

The third motor means may comprise a ram connected between the clamping means and the implement.

The second auxiliary device may comprise means to rotate the implement about an axis which lies in a vertical plane containing the longitudinal axis of the boom.

The vehicle may be provided with a condition sensor means.

The condition sensor means may provide a signal to a transmitter, of an electromagnetic signal, provided on the body.

The electromagnetic signal may be transmitted by the transmitter on the body to a receiver disposed at a location remote from said vehicle.

The receiver may be disposed at the same location as said transmitter and may be spatially associated therewith.

The vehicle may have at least one camera to provide a signal to a transmitting means, provided on the vehicle, for transmission of an electromagnetic signal to a receiving means disposed at a location remote from the vehicle for display of an image provided by the camera.

In one subsidiary aspect of the invention:

The boom assembly may comprise a generally "L" shaped member comprising a single lift arm assembly which extends forwardly along one side only of the vehicle and a pivot member which is rigid with the lift arm assembly, which projects from the inner end of the lift arm assembly on one side thereof and extends transversely across the body from one side of the lift arm assembly to a position adjacent the opposite side of the body, the pivot member being pivotally mounted on the body by pivotal mounting means which are spaced apart transversely of the body and are adjacent an upper rear end part of the body on opposite sides of the body.

The body may be provided with an abutment means to support the implement carrying member against displacement in a direction rearwardly of the vehicle when the boom assembly is in a lower position.

The lift arm assembly may comprise a major rectilinearly extending part which extends from the inner ends towards the outer end and a minor part which is inclined downwards relative to the major part and is disposed between the major part and said implement carrying member.

Said major and minor parts are inter-connected by an intermediate part disposed therebetween and extending transversely inwardly from said major part to said minor part.

The lift arm assembly, including the pivot member and the implement carrying member may comprise a unitary component.

The body comprises a pair of transversely spaced side members on which said ground engageable propulsion means are mounted.

At least a lower portion of the control region may be disposed between said side members.

The body may have a transmission compartment at least a portion of which is disposed between said side members and said transmission compartment housing a transmission to transmit drive from an engine of the vehicle to the ground engageable propulsion means.

The body may be provided with an engine compartment rearwardly of the control region and transmission compartment and said engine compartment housing the engine of the vehicle.

The pivotal mounting means may be supported by a pair of transversely spaced upright members disposed adjacent the rear of the body and which extend upwardly from said side members at the rear of the control region.

The side members may comprise loop case compartments comprising a transversely inner wall and a transversely outer wall joined by top and bottom walls and end walls and a member providing one of said walls, preferably the outer wall, may be provided integrally with the member which provides at least part of one plate, and preferably an inner plate, of each upstanding member.

The ground engageable propulsion wheels may be disposed on opposite sides of the body, each propulsion wheel being carried on an outer end of a stub axle which is housed, so as to be rotatable about an axis of rotation, in a stub axle housing member mounted on the body.

An inner end of each stub axle may have a driven wheel thereon which is driven by a flexible loop from a driving wheel driven by a motor.

An inner end of each stub axle may be driven by other means such as a separate motor for each stub axle.

Each stub axle housing member may be provided with a carrier member which is mountable on the body for rotation about a reference axis, the stub axle housing members being positioned relative to the carrier member so that said axis of rotation is disposed eccentrically relative to said reference axis.

The carrier member and the body may be provided with co-operating guide means which guide the carrier member for rotation about said reference axis.

The body may be provided with an engine, two pairs of ground engageable propulsion wheels disposed on opposite side of the body, a hydraulic drive means including first and second variable displacement pumps driven by the engine and operatively connected to first and second hydraulic motors disposed on opposite sides of the body, each pump being drivably connected on two ground engageable propulsion wheels of an associated one of said pair of wheels on the associated side of the body by first and second endless loops each of which is engaged with a driving wheel driven by the pump and with a driven wheel connected to an associated one of the ground engageable wheels of said pair and propulsion control means whereby the hydraulic drive means can drive the pair of wheels on one side of the vehicle at the same or a different speed and/or direction from the pair of wheels on the other side of the vehicle to propel and steer the vehicle.

The body may be provided with a longitudinally extending loop case compartment, one on each side of the vehicle, each loop case compartment having a transversely inner wall and a transversely outer wall joined by top and bottom walls and end walls, said stub axle housing member or members being mounted on the outer wall with said driven wheels or wheels disposed within said compartment.

Two stub axle housing members may be provided on each side of the vehicle and each of said housing members are mounted on said outer wall with said driven wheels disposed within the compartment with said driving wheels disposed within the compartment therebetween with said loops engaged with respective driving and driven wheels.

The outer wall may be provided with a circular opening for the or each housing member to provide one of said co-operating guide means.

In a second subsidiary aspect of the invention:

The boom assembly may comprise a single lift arm assembly which extends forwards along one side only of the vehicle and an inner end of the lift arm assembly is pivotally mounted on the body by pivotal mounting means disposed on said one side only of the vehicle.

The vehicle may comprise a transmission case means, disposed on one side of the vehicle, having therein said first and second transmission means.

The first transmission means may comprise a first drive member projecting from one side of the transmission case means and drivingly connected to the first ground engageable propulsion means and the second transmission means comprises a second drive member projecting from the opposite side of the transmission case means and extending transversely across the vehicle so as to be drivingly connected to the ground engageable propulsion means.

The first transmission means may comprise a front first drive member and rear first drive member each projecting from one side of the transmission case means and drivingly connected to the first ground engageable propulsion means and the second transmission means comprising a front second drive member and a rear second drive member projecting from the opposite side of the transmission case means and extending transversely across the vehicle and drivingly connected to the second ground engageable propulsion means.

Each drive member may be drivingly connected to a respective driven wheel which is driven from a drive element, preferably by a drive loop.

The transmission case means may comprise a pair of spaced, preferably parallel, side walls between which said first and second transmission means are disposed.

The side walls may be joined by top and bottom walls and by opposite end walls.

The side walls may be provided with extension parts which comprise side walls of an upright disposed on said one side only of the vehicle and providing in an upward region thereof, said pivotal mounting means for the boom assembly.

The ground engageable propulsion means may comprise ground engageable wheels arranged so that each ground engageable propulsion wheel of the first ground engageable propulsion means is carried at an outer end of a stub axle which is housed, so as to be rotatable about an axis of rotation, in a stub axle housing member mounted on the body, said stub axle providing, or being driving connected, to a said drive member of the first transmission means.

Each ground engageable propulsion wheel of the second ground engageable propulsion means may be carried at an outer end of an elongate axle which is housed, so as to be rotatable about an axis of rotation, in an elongate axle housing member mounted on the body.

The stub axle housing member may be mounted on said one wall of the transmission case means.

The elongate axle housing may be mounted in an aperture of said opposite wall of the transmission case means adjacent one end and in an aperture or other mounting arrangement provided on an opposite side of the body.

The body may be provided at said one said with said transmission case means and on the opposite side of the body with an opposite side wall which may have therein a downwardly extending recess between the front and rear second drive members to provide access to a region of the body disposed between said opposite sides.

The transmission case means and the opposite side walls of the body may be interconnected by front and rear transversely extending parts of the body. The rear transversely extending part may be disposed forwardly of the rear of the body to provide an engine compartment between side portions of the body adjacent the rear thereof.

Said rear transversely extending part may be disposed in front of said rear drive members. Each ground engageable propulsion wheel may be driven by a flexible loop from a driving wheel driven by a motor.

The or each side loop may comprise a chain such as a roller chain and the drive elements and driven wheels may comprise sprockets for engagement with the chain.

Alternatively, the or each drive loop may comprise a toothed or untoothed belt and the drive elements and driven wheels comprise co-operating pulleys.

The drive element may be carried on an output shaft of a motor, or by a shaft driven by an output shaft of a motor.

Each motor may be mounted on the same side of the transmission case means as each other.

Each motor may be mounted on the outer or, preferably, the inner wall of the transmission case means so as to be disposed outwardly of the case means with the drive element disposed within the transmission case means.

The vehicle is provided with improved structural integrity, by providing the single tower as described hereinbefore as an extension of the transmission case means allows the input from the loader to be transmitted to the transmission case.

The provision of each motor on the same inner wall of the transmission case means has the advantages of improved protection, a minimised wheel base is possible as there is no intrusion between the tires of the wheels, servicing is easier and hose runs are easier.

The remote control unit may have a left hand joystick and a right hand joystick to provide propulsion control of the vehicle.

Movement of a joystick in a forward direction may cause the respective propulsion means to provide forward drive whilst movement of a joystick in a rearward direction causes the respective propulsion means to provide rearward drive.

Leftward sideways movement of the left hand joystick may cause lifting of the boom assembly whilst rightward sideways movement of the left hand joystick may cause lowering of the boom assembly.

Leftward sideways movement of the right hand joystick may cause operation of the crowd ram to cause the implement to pivot upwards while right and sideways movement of the right hand joystick may cause the implement to pivot downwards.

The remote control unit may be provided with a first auxiliary joystick arranged to provide operation of the first auxiliary as a result of forward and reverse movement thereof and may be provided with a second auxiliary joystick so that forward and reverse movement thereof causes operation of the second auxiliary.

The remote control unit may be provided with at least one of the following additional controls; engine start, glow plugs, engine speed control, park brake switch, water dispense, emergency stop, audible warning operation.

BRIEF DESCRIPTION OF THE DRAWINGS

Two embodiments of this invention will now be described with reference to the following drawings wherein.

DESCRIPTION OF PREFERRED EMBODIMENTS

Figures 1, 1A:
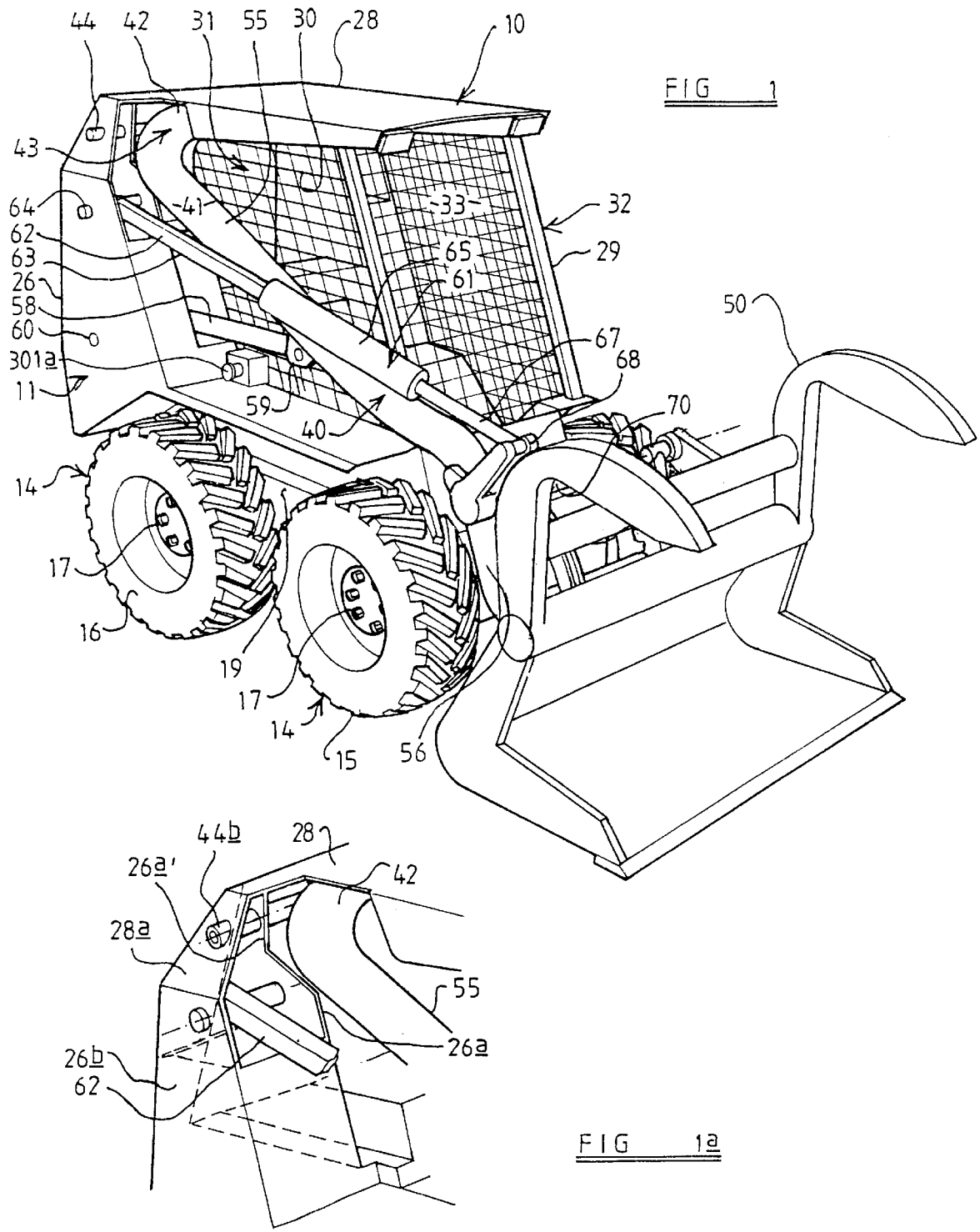
FIG. 1 is a perspective view of a remote control vehicle embodying the invention.
FIG. 1a is an enlarged fragmentary view of part of FIG. 1 to an enlarged scale.

Referring now to FIGS. 1 to 6 of the drawings, a remote control loader vehicle 10 comprises a body 11 having a front end 12 and a rear end 13. The body 11 is provided with ground engageable propulsion means 14 comprising a pair of front wheels 15 disposed forwardly of a pair of rear wheels 16. The vehicle 10 is propelled in a straight line fowardly or rearwardly by driving all four wheels or, to steer the vehicle, by driving the wheels 15 and 16 on one side at a different speed and/or direction than those on the other side. Such a remote control vehicle has a high degree of manoeuvrability and to facilitate skid steering and in particular, for example, the ability of the vehicle to turn about a central axis of the ground engageable propulsion means the wheel base is made, in the present example, slightly shorter than the track of the vehicle although, if desired, the wheel base may be the same or longer than the track if desired.

The wheels 15, 16 are carried on stub axles 17n which project outwardly from a pair of transversely spaced side members 18, 19 of the body 10 and which extend fore and aft of the vehicle. Between the side members 18, 19 is a transmission compartment 20 which houses a transmission 21, hereinafter to be described in more detail, whilst above and forwardly of the transmission compartment 20 is a control compartment 22 in which is provided a receiver 23 of electromagnetic radio signal and which provides a plurality of electrical output signals on outputs A–H and $S_1$–$S_{12}$ in accordance with the radio signal.

The outputs A–H and $S_1$–$S_{12}$ include outputs for controlling the speed of the pair of wheels 15, 16 on opposite sides of the vehicle so that the speed and direction of movement of the vehicle can be controlled as described in more detail hereinafter, control the lift of a loader aim and pivoting of an implement as hereinafter described and controls for controlling one or two or more auxiliary devices all as hereinafter to be described.

The control compartment 22 is also defined by lower parts of pair of upstanding members 26, 27 which extend upwardly from the side members 18, 19 on opposite sides of the vehicle. A support which extends forwardly from the members 26, 27 at the top thereof and adjacent its forward ends is support by posts 29. Cameras 23 and lights 24 are carried on the support 28 and/or are otherwise supported thereby and/or by the posts 29.

Behind the transmission compartment 20 and control compartment 22 is provided an engine compartment 34 in which an engine 35 of any suitable type is housed. In the present example the engine is an air-cooled diesel engine but any other suitable engine may be provided.

The vehicle is provided with a loader arm boom assembly 40 which is disposed adjacent the one side 31 of the vehicle so as to be disposed on one side of a longitudinal axis of the vehicle centrally disposed between the ground engageable wheels 15, 16. The loader arm assembly 40 comprises a lift arm assembly 41 and extends transversely of the body and is pivotally mounted on the body by pivotal mounting means 44, 45 provided on the upstanding members 26, 27 respectively. The lifting arm assembly 41 has an implement carrying member 46 which projects from an outer end 47 of the lifting arm assembly and extends transversely across the front end of the body and has an implement 48 carried thereby so as to be disposed forward of the front end 12 of the body 11. In the present example the implement 48 is a bucket 49 provided with clamping elements 50 which comprise a first auxiliary device, operated by a hydraulic ram hereafter referred to as a third motor. The implement 48 may be arranged so as to be rotated by a suitable hydraulic motor, herein referred to as a fourth motor, about an axis which lies in or is parallel to a vertical plane containing the longitudinal axis of the vehicle. The hydraulic motor provides a second auxiliary device. If desired other implements may be provided such as forks, pincers, bulldozer blades, manipulators or the like or other tools and the implements may be provided with one or more auxiliary devices as desired.

The pivotal mounting means comprise a pivot boss 44a welded in an aperture provided in an inner plate 27a of the upstanding member 27 and a pivot pin 45 is fixed therein. At its other end the pivot pin 45 is fixed in a further pivot boss 44b which is welded in an aperture in an inner plate 26a of the upright 26 and a downwardly inclined part 28a of the roof plate 28.

At its free end the pivot member 42 has a bearing housing 42a welded therein and the housing 42a carries a bush to rotatably mount the pivot member 42 on the pivot pin 45. At its other end the pivot member 42 has a further bearing housing 42b in the form of a bush welded in an opening formed in the pivot member 42 where it merges into a major part 55 of the lift arm assembly 41 and the bearing housing 42b again houses a suitable bearing bush to pivotally mount the pivot member 42 on the pivot pin 45. The inner plate 26a is cut away in this region, as shown at 26a' in FIG. 1a, to accommodate the boom assembly.

Figure 3:
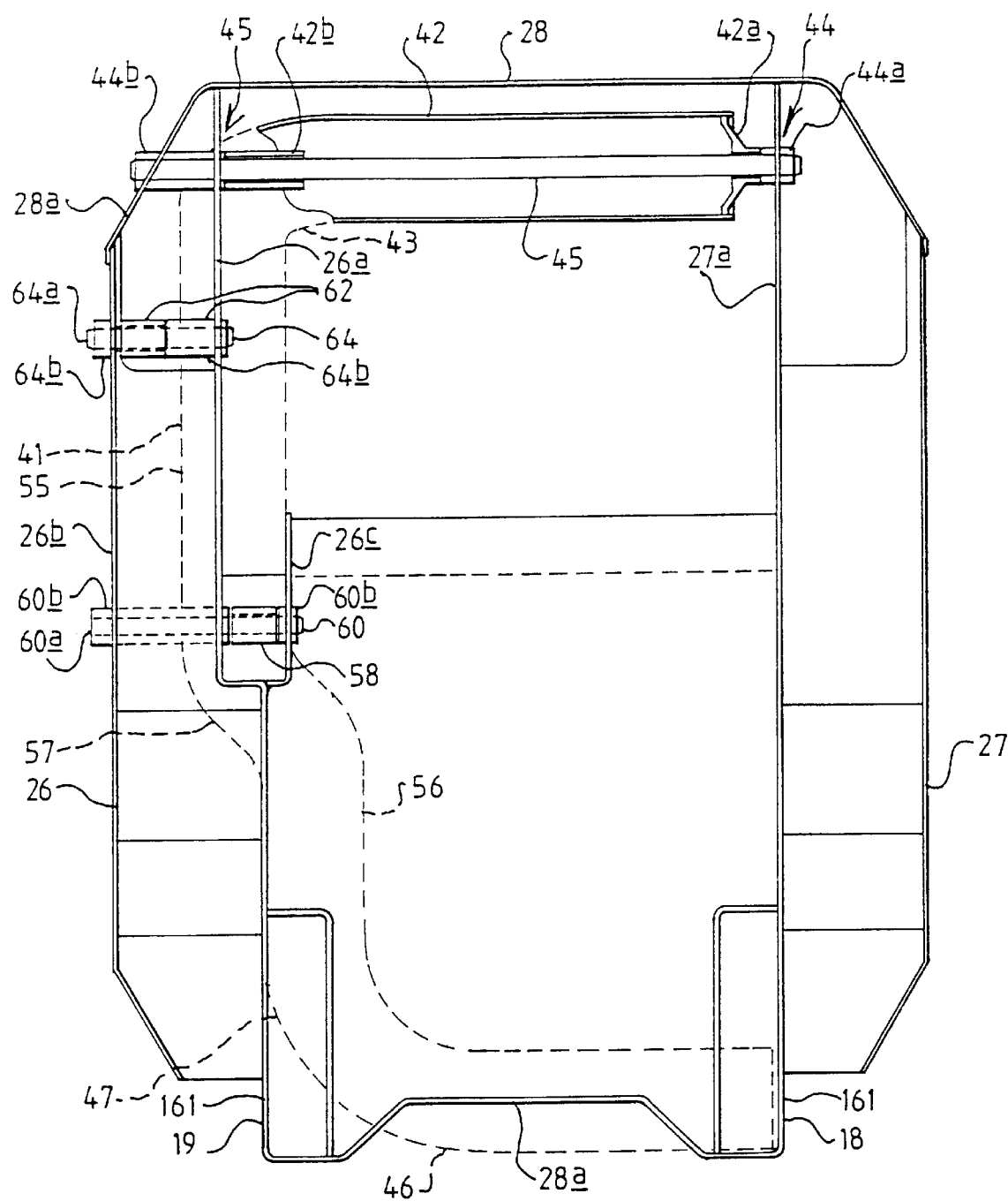
FIG. 3 is a section on the line 3—3 of FIG. 2.
Figure 4:
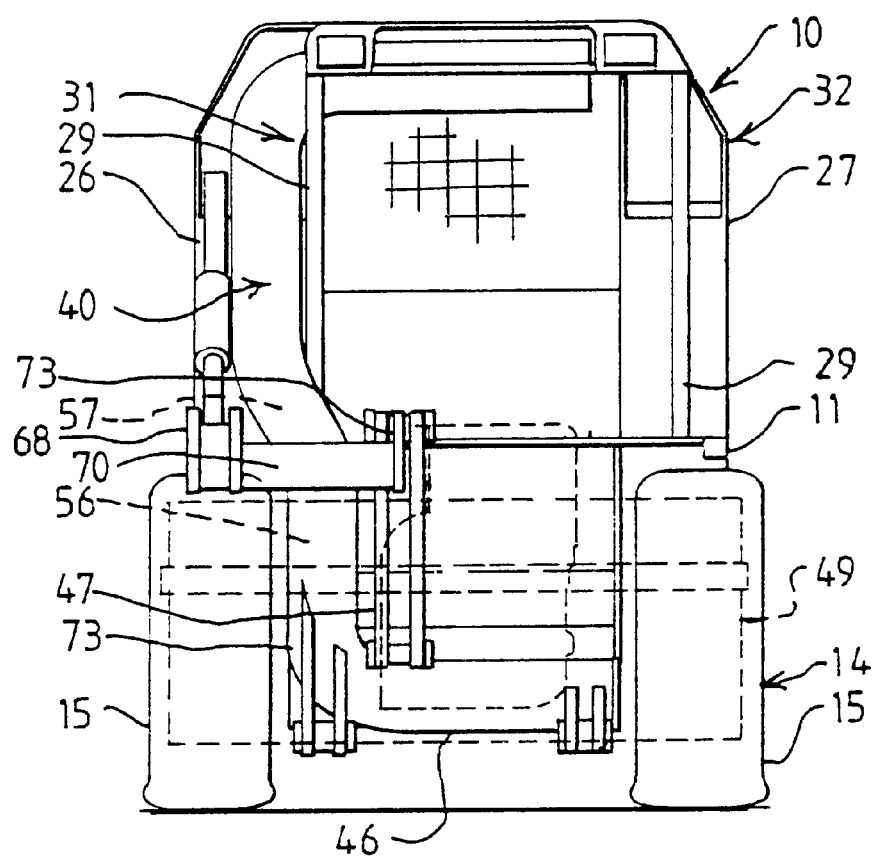
FIG. 4 is a front elevation of the vehicle of FIG. 1 with part omitted for clarity.

The lift arm assembly 41, pivot member 42 and an implement carrying member 46 are formed as a unitary member by bending a steel tube to the desired shape. It will be seen that the lift arm assembly 41 comprises a major part 55 which extends generally rectilinearly from the inner end 43 towards the outer end 47 and a minor part 56 which extends generally downwardly and forwardly relative to the main part 55 and is disposed between the main part 55 and the implement carrying member 46. As best shown in FIGS. 3 and 4 an intermediate part 57 is provided between the main and minor parts 55, 56 which is inclined forwardly and transversely inwardly so as to position the minor part 56 within the front wheels 15 and in front of the body 11.

A hydraulic lift ram 58 hereafter referred to as a first motor is pivotally connected between a bracket 59 welded to the lift arm assembly 41 and the upstanding member 26 about an axis indicated at 60. The pivotal connection of the lift ram 58 to the upright 26 at the axis 60 comprises a pivot pin 60a which is fixed in pivot bushes 60b welded in openings provided in the inner plate 26a, and an outer plate 26b and a further plate 26c of the upstanding member 26. The cylinder of the ram 58 is pivotally mounted on the pivot pin 60a. The lift ram when actuated is adapted to raise and lower the lift arm assembly 41 between a lower position shown in FIGS. 1 to 3 in full line and a raised position shown in chain dotted line in FIG. 2.

An implement levelling link is indicated generally at 61 and comprises a first link 62 which comprises a bar 63 pivotally connected to the upstanding member 26 about an axis 64 and connected to a crowd ram 65 from a cylinder 66 of which a piston rod 67 projects forwardly and is pivotally connected to one end of a first lever 68. Herein the ram 65 is referred to as a second motor. The pivotal connection of the first link 61 comprises a pivot pin 64a fixed in pivot bushes 64b welded in apertures in the inner and outer members 26a, 26b respectively whilst the bar 63 is pivotally mounted on the pivot pin 64a.

The first lever 68 is pivotally mounted on the lift arm assembly 41 by a pivot member 69 and is connected by a torque tube 70 to a second lever 71 which is pivotally connected at its outer end 72 to a second, fixed length link 73 which is pivotally connected to the bucket 49 as shown at 74.

The respective positions of the axis of pivot of the lift arm assembly 41 provided by the pivot pin 45 and the connection of the implement levelling link to the upstanding member 26 at axis 64 together with the length of the first and second levers 68, 71 and the position of pivotal connection of the second link 73 to the bucket 49 at 74 together with the position of pivotal connection of the bucket 49 to the implement carrying member 46 at 75 is arranged so as to provide a linkage which ensures that the orientation of the bucket 49 relative to the body is preserved irrespective of the angular position of the lift arm assembly 41 so long as relative movement does not occur between the piston rod 67 and cylinder 66.

Figure 2:
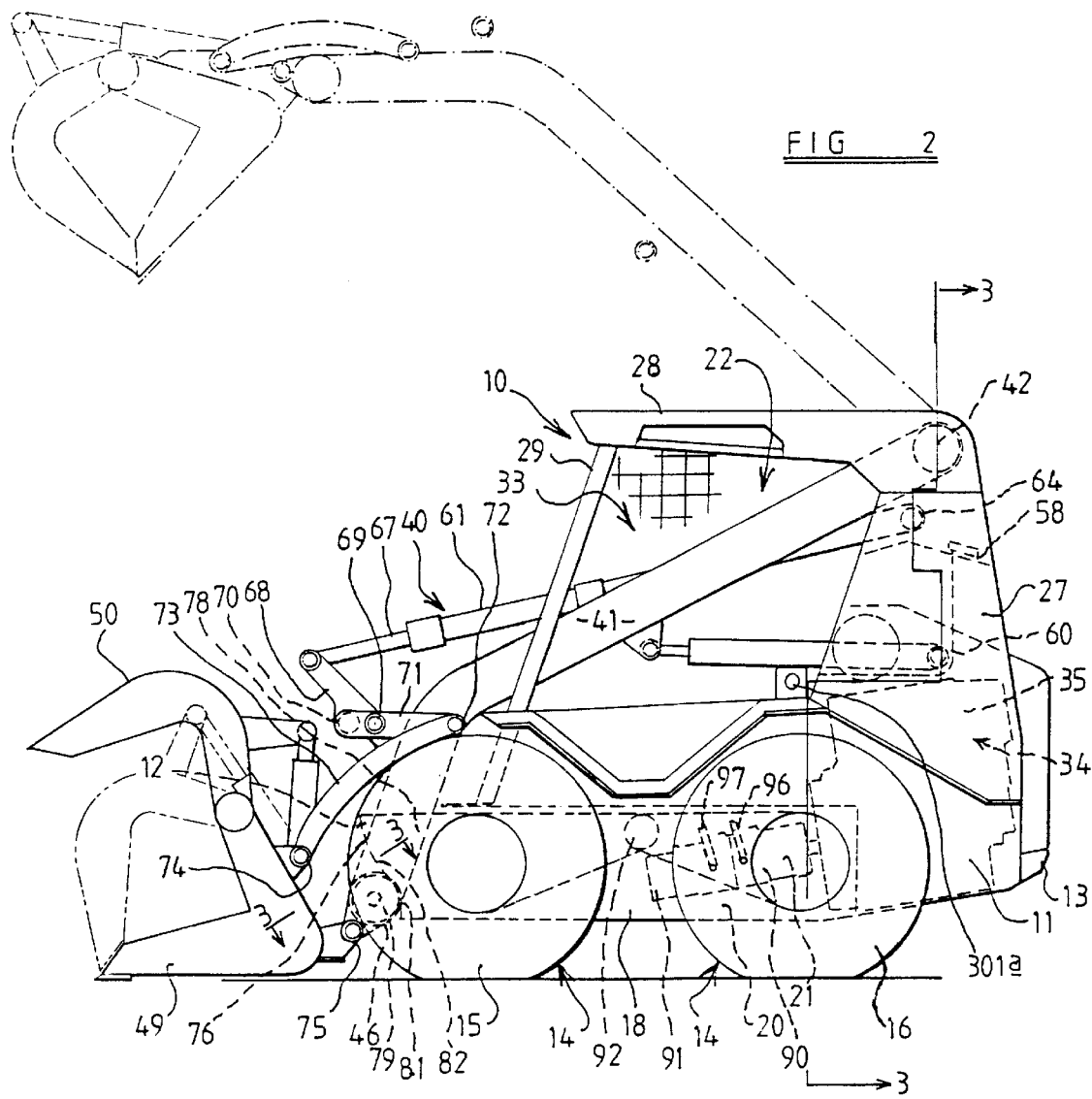
FIG. 2 is a side elevation of the vehicle of FIG. 1 and showing the opposite side thereof to that shown in FIG. 1.

When it is desired to pivot the bucket upwardly, i.e. cause it to rotate about the axis 75 in a clockwise direction as viewed in FIG. 2, fluid is supplied to the cylinder 65 to act on the larger diameter side of the piston therein so as to force the piston rod 67 out of the cylinder 65 so that the above described linkage causes the desired clockwise movement of the bucket 49. Such movement is generally required in operation to lift material and is known as "crowd" movement. Because the fluid is operative upon the whole cross-sectional area of the piston a relatively high power action is provided in this direction.

When it is desired to rotate the bucket in an anti-clockwise direction as shown in FIG. 2, commonly known as "dumping" then fluid is supplied to act on an annular surface of the piston surrounding the piston rod 676 so that a smaller cross-sectional area is acted upon and therefore a faster, although less powerful action, is provided.

At the front end 12 of the side member 18 there is provided an abutment surface 76 provided by a bar 77 welded to a cam plate extension 78 of the side member 18. The bar 77 is adapted to abut a flanged roller 79 rotatably mounted on a spigot 80 projecting from the free end of the implement carrying member 46. The abutment surface 76 comprises a lower, generally vertical surface part 81 and a forwardly and upwardly inclined part 82, the surface parts 81 and 82 being contoured to co-operate with the roller 79 as the lift arm assembly 41 approaches its lowermost position and to prevent rearward displacement of the free end of the implement carrying member 46 when in such a lower position, for example, when driving a vehicle forwardly to load the bucket 49. If desired the abutment surface 76 may be extended upwardly so as to support the member 46 over a greater height.

From the foregoing it will be seen that boom assembly 40 extends forwardly from a position adjacent the rear end of the body 11 to one side 31 of the body 11 and its control compartment 22.

By providing the axis of pivot of the lift arm assembly 41 adjacent the top of the rear corner of the upstanding members 26, 27 the vehicle is provided with the ability to lift the implement to a relatively great height and at the same time provide the implement with good reach and the vehicle with stability. For example, the axis of pivot of the lift arm assembly is approximately 1.5 m above the ground in the example illustrated, whilst the distance between the axis of the pivot of the lift arm assembly and the axis of pivot of the implement about the axle 75 is approximately 2.5 m. Hence the vehicle has a total lift of approximately 3 m and over the whole of this range of lift the pivotal connection 75 to the bucket lies forwardly of the front end 12 of the vehicle.

The transmission 21 comprises a pair of conventional swash plate hydrostatic pumps 90, 91 the output of which is sent, in conventional manner, to a conventional hydrostatic motor 92a, b. In this example the rearmost pump 90 provides a feed to the motor 92a on the left-hand side of the vehicle whilst pump 91 provides feed to the corresponding pump 92b on the right-hand side of the vehicle.

The pumps 90, 91 each have an input member 93, 94 respectively which are rotatable about spaced parallel axes which extend perpendicular to a fore and aft axis of the vehicle and which lie in a substantially horizontal plane.

The input members 93, 94, in the present example, control the angle of the swash plates of their associated hydraulic pump through the intermediary of a hydraulic servo mechanism in-built into the hydraulic pump.

The side members 18, 19 each comprise a loop case compartment and as best shown in FIG. 3 each comprise a transversely inner wall 160 and a transversely outer wall 161 which are joined by top and bottom walls 162, 163 and end walls 164, which provide an oil tight compartment.

It will be seen that the outer walls 161 provide the main chassis members of the vehicle body and that at the rear of the vehicle extensions of the outer walls provide the inner side plate of the upstanding members 26, 27. In addition, a transversely extending member 165 interconnects the main chassis members 161 together and provides a floor to the body.

The loop case compartments 18, 19 have mounted thereon, at the positions shown in FIG. 2, the ground engageable propulsion wheels 15, 16 and the motors 92.

Figure 5:
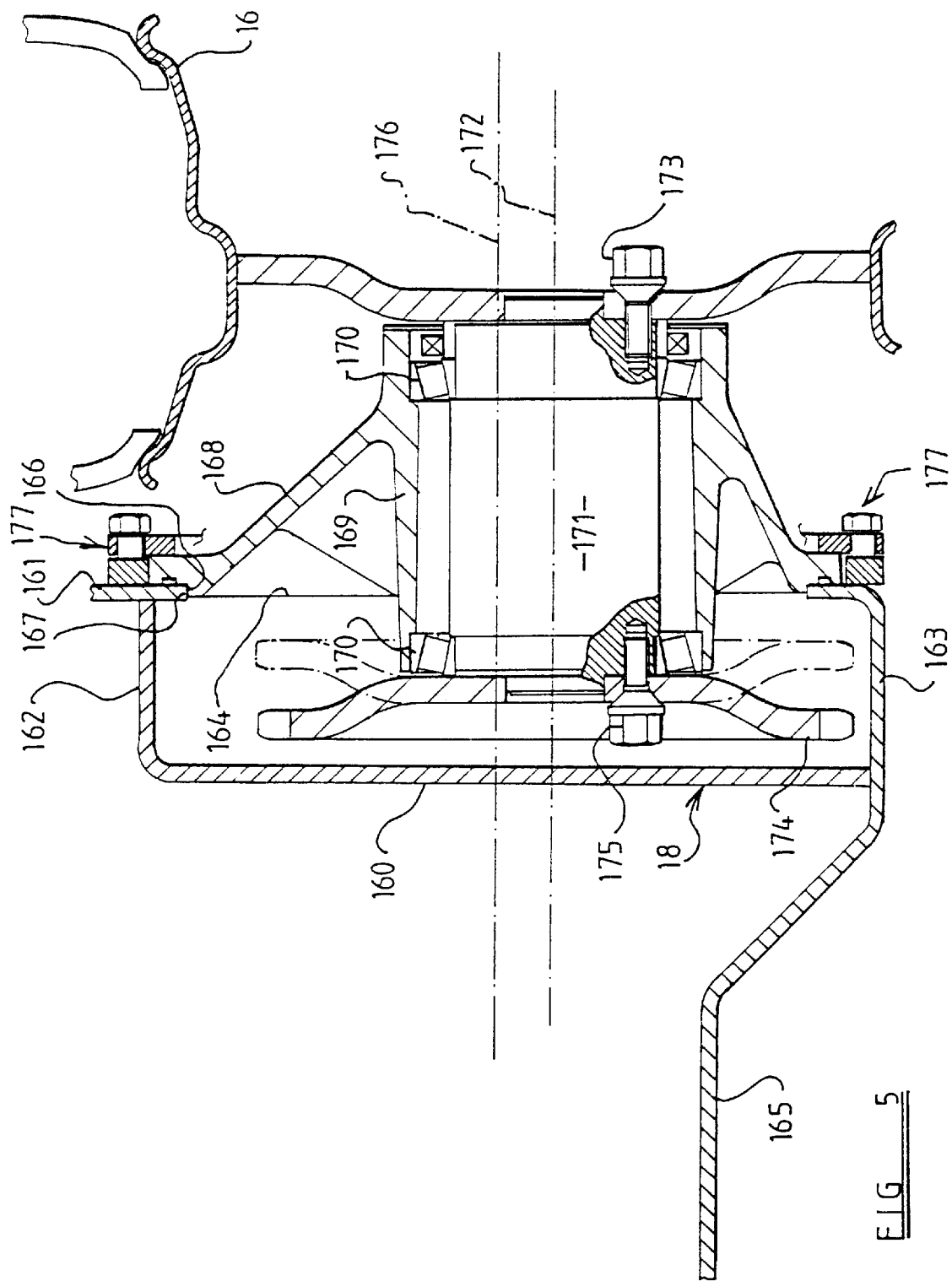
FIG. 5 is an enlarged, fragmented, sectional view of a wheel mounting on the vehicle of FIG. 1.

Referring now particularly to FIG. 5, there is illustrated the mounting of one of the ground propulsion wheels 16 on the loop case compartment 18 although it should be appreciated that each of the four wheels is mounted on its associated loop case compartment in exactly the same manner and do not require separate description.

At the location of the wheel 16 the outer wall 161 is provided with a circular opening 166 which provides a first guide means which co-operates with a second guide means provided by a rebate 167 of a carrier member 168 of generally frusto-conical configuration and formed integrally with a stub axle housing member 169. The stub axle housing member 169 carries taper roller bearings 170 so that a stub axle 171 is housed by the member 169 so as to be rotatable about an axis of rotation 172.

The wheel 16 is bolted to one end of the stub axle 171 in convention manner by bolts 173 whilst a driven wheel in the form of a sprocket 174 is bolted to the other end of the stub axle 171 by bolts 175.

The stub axle and its housing, together with the carrier member 168 are configured so that the sprocket 174 is disposed within the loop case compartment 18. The teeth of the sprocket 174 are offset from a central mounting part of the sprocket so that the sprocket can be fastened to the stub axle 171 in a reverse orientation, shown in dotted line in FIG. 11, when attached to the stub axle for the other wheel on the same side of the vehicle.

The carrier member 168 is formed so that the axis of rotation 172 of the stub axle 171 is eccentrically disposed relative to the central axis of the rebate 167 and hence relative to a reference axis 176 about which the carrier member 168 is constrained to rotate by co-operation between the hereinbefore mentioned guide surfaces 166, 167.

Clamping means, such as an annular ring 177, are provided to enable the carrier member 168 to be clamped to the outer wall 161 in any desired angular orientation around the reference axis 176.

By the above described eccentric disposition of the axis 172 relative to the axis 176, the position of the axis 172 both longitudinally and vertically of the vehicle can be adjusted thereby permitting of adjustment of the wheel base of the vehicle, in association with driving chains of appropriate lengths, as well as permitting of adjustment of the ground clearance of the vehicle together with providing a facility for tensioning a chain of a given length.

It will be seen that the stub axle 171 is supported solely from the side wall 161 without any support being afforded by the inner wall 160 thereby avoiding the need to effect any machining operations on the wall 160 which would otherwise be necessary is the stub axle were additionally supported thereby.

In addition, a clearance is provided between the sprocket member 174 and the wall 160 to permit of manipulation of a chain through the space and hence into driving relationship with the teeth of the sprocket 174.

Figure 6:
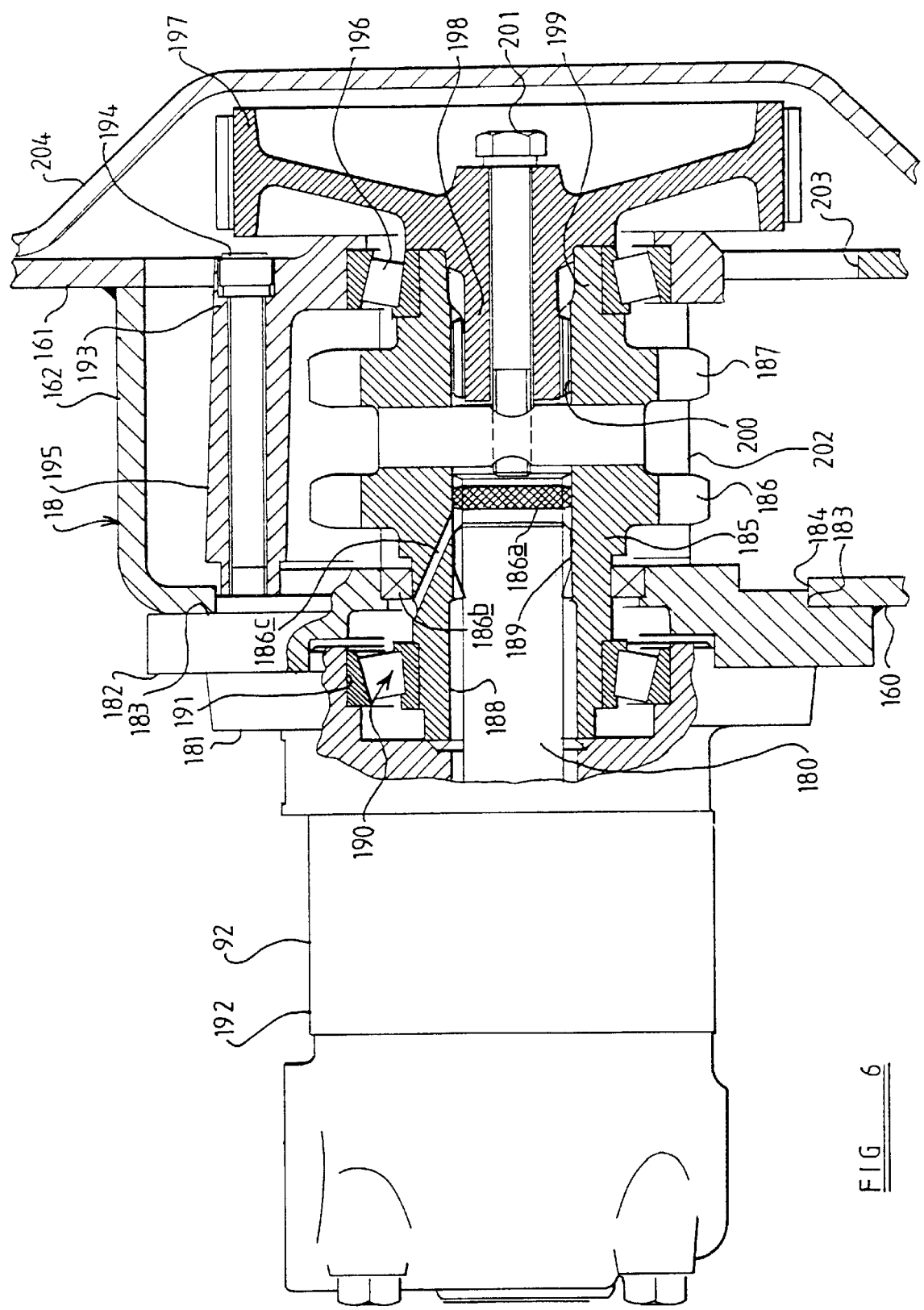
FIG. 6 is an enlarged, fragmented, sectional view of a motor mounting on the vehicle of FIG. 1.
Figure 7:
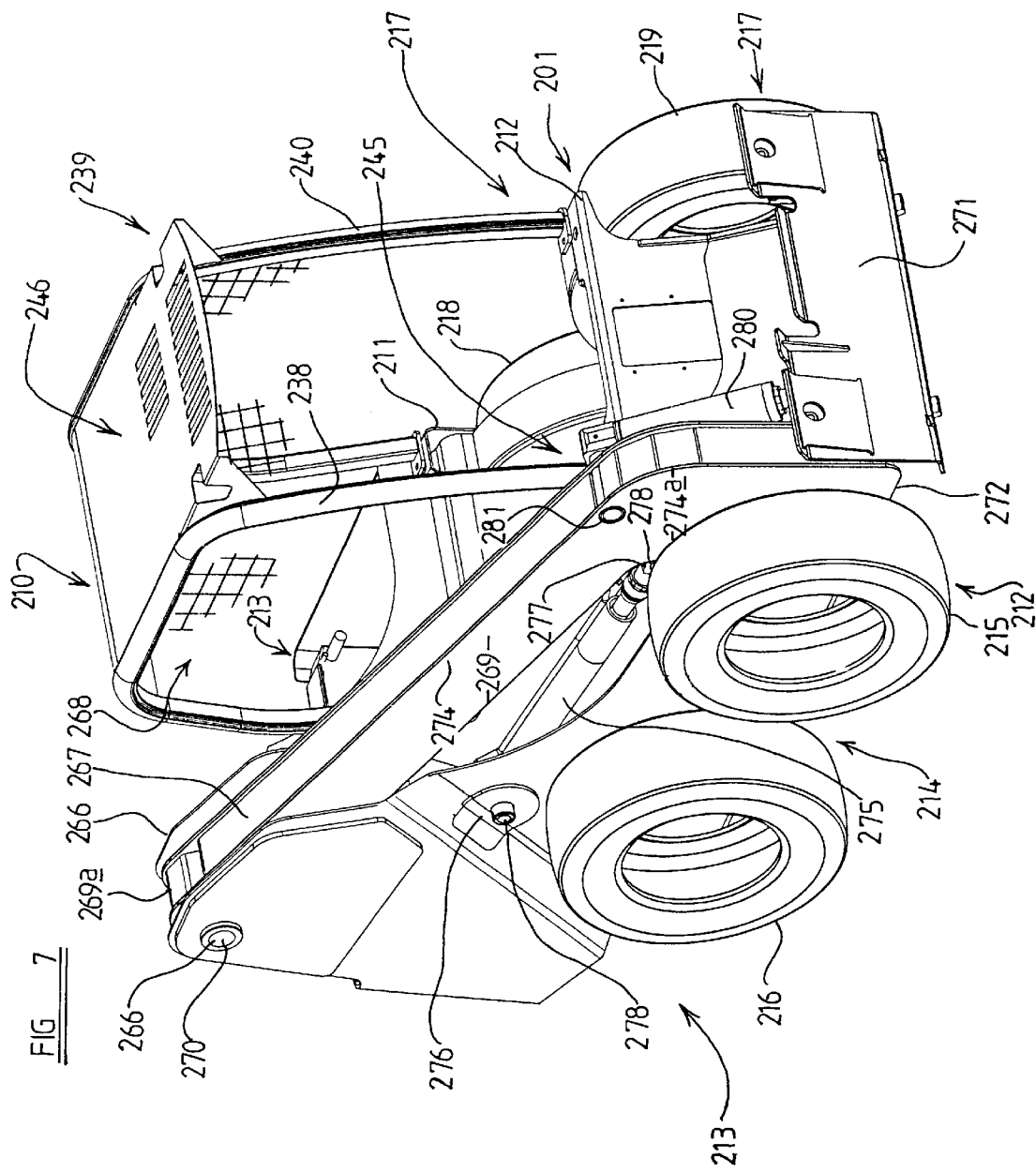
FIG. 7 is a perspective view of another skid steer loader vehicle embodying the invention.
Figure 8:
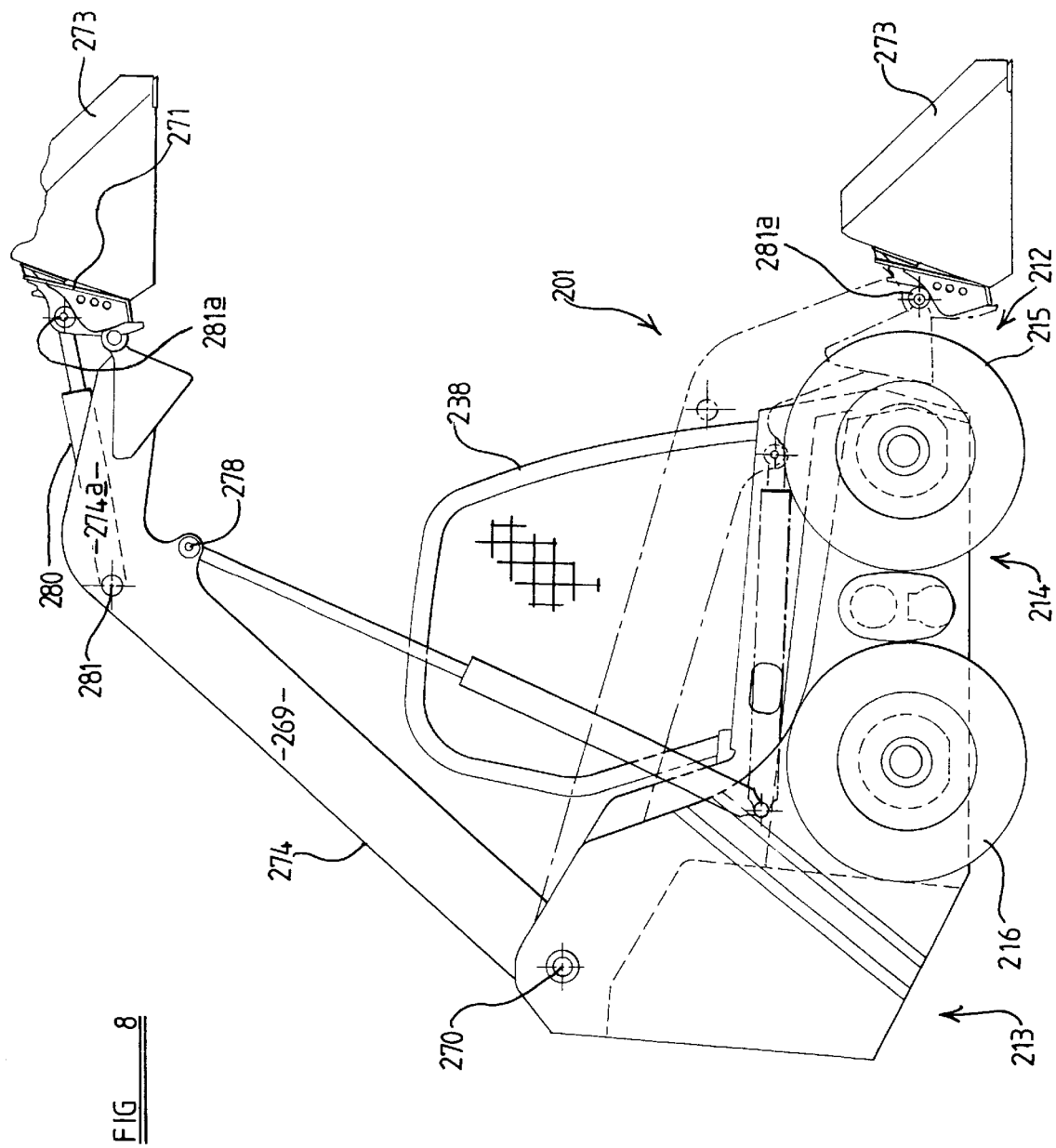
FIG. 8 is a side elevation of the vehicle of FIG. 7.

Referring now to FIG. 6, there is shown the mounting of a motor 92 on the loop case compartment 18.

The motor 192 is a conventional commercially available high torque motor and has a conventional output shaft 180. The motor 92 has a mounting flange 181 by which it is bolted to a mounting plate 182 welded to the inner wall 160 of the compartment 118. The mounting plate 182 has a rebate 183 which is received within a circular aperture 184 formed in the wall 160 to aid location of the ring 182.

A sleeve 185 is machined to provide a pair of driving wheels in the form of sprockets 186, 187 and an inner part 188 of the central passage of the sleeve 185 has the output shaft 180 received therein with a splined connection 189 provided therebetween.

A seal 186a is provided in the central passage and shaft seal 186b is also provided so that lubricating oil for the splined connection 189 supplied from the motor 192 is caused to flow via bore 186c to lubricate the bearing 190 before returning to the motor.

A taper and roller bearing 190 is provided between the external surface of the sleeve 188 and a seat 191 provided by the body 192 of the motor 92.

Figure 12:
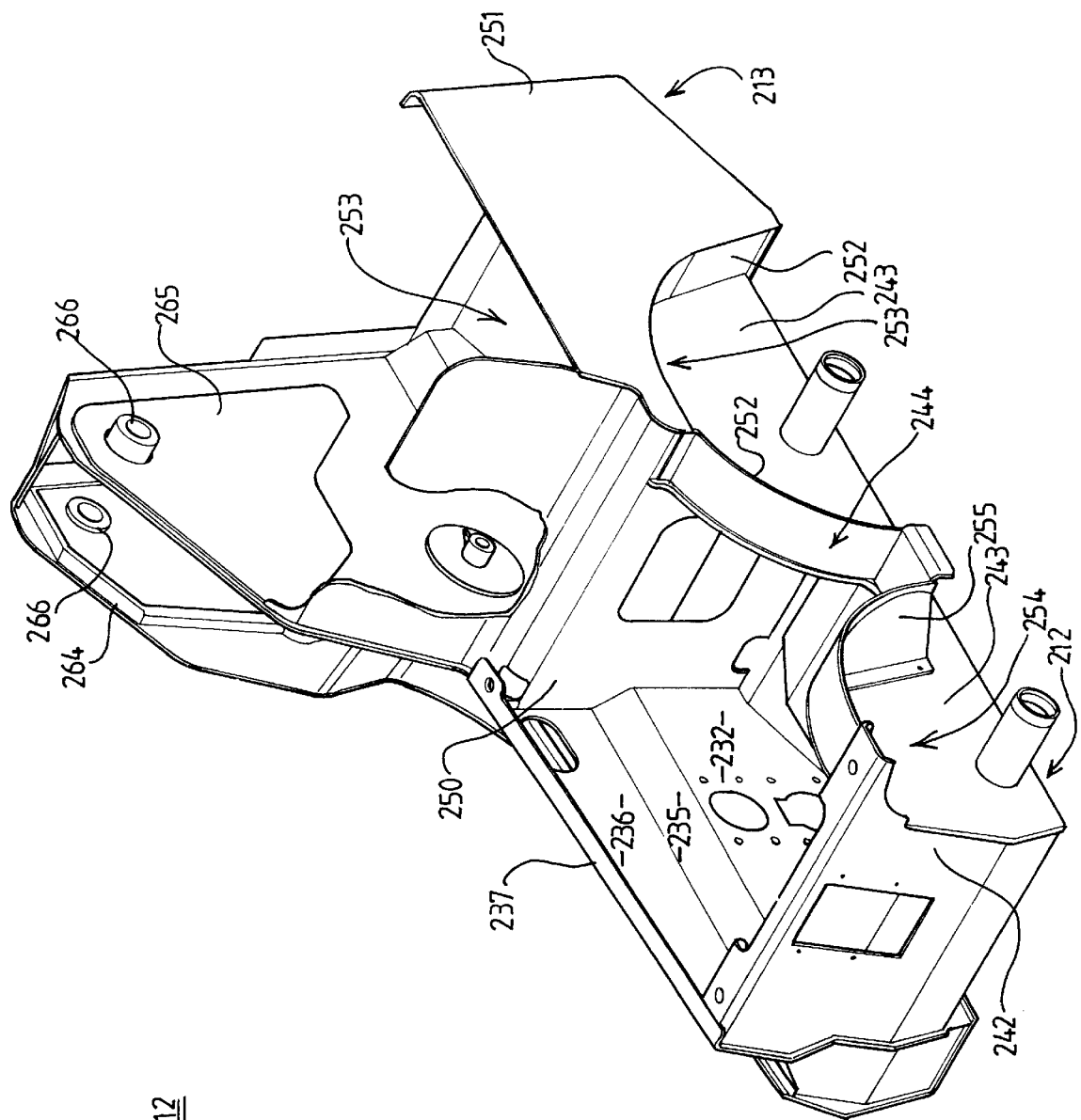
FIG. 12 is a perspective view similar to that of FIG. 10 but taken from the opposite side of the vehicle body.

A bracket member 193 in the form of a three-legged spider is bolted to the pump body 192 by bolts 194, only one leg 195 and one bolt 194 being shown in FIG. 12, the other two legs and bolts being equally angularly disposed around the axis of rotation of the output shaft 180. A further taper roller bearing 196 is provided between the bracket 193 and an outer surface part of the sleeve 185.

A brake drum 197 is formed with a boss 198 which is received within an outer part 199 of the central passage of the sleeve 185 and is retained in splined engagement therewith, as shown at 200 by a bolt 201. The sleeve is provided with a transversely extending passage 202 to receive a locking pin for the bolt 201.

Chains, such as roller chains, not shown, are looped around the respective sprockets 186, 187 and the respective driven sprockets 174 and the sprocket, not shown, of the other wheel.

To assemble the sprocket and chain drive, initially the chains are manoeuvred into the compartment 18 through an opening 203 provided in the outer wall 161 and are passed between the inner wall 160 of the compartment 18 and the respective driven sprocket such as the sprocket 174. At this stage, although the motor 92 is bolted in position, the sleeve 185 and the bracket 195 are absent.

The sleeve 185 is then offered up the outward shaft 180 and the chains are then manoeuvred over the outer end of the sleeve 185 and into position on their associated sprockets 186, 187. The hereinbefore described eccentric mounting of the stub axles permits the stub axles axes 172 to be moved towards the motor 92 to provide sufficient slack in the chain for the above manipulation to occur.

The bracket member 195 is then bolted in position with the chains passing through the spaces between the legs 195 thereof. Thereafter the brake drum 197 is bolted in position and finally an extension housing enclosure member 204 is bolted in fluid tight relationship to the outer wall 161.

In the assembly described with reference to FIG. 6, the output shaft 180 and the associated driving sprockets 186, 187 and brake drum 197 are supported entirely from the motor through the bracket 195 and receive no support from any component which is independent of the motor and in particular do not receive any support from the outer member 161. It is therefore unnecessary to perform any machining operation on the member 161 other than the simple formation of the clearance opening 203 which may be made, for example, by flame cutting.

If desired, the motor described above may be mounted on the outer wall 161 instead of the inner wall.

Instead of driving the stub axles from a shaft motor through loops, if desired, the stub axles may be driven by other means such as, by providing a separate motor which may drive each stub axle directly. In this case, if desired the above described eccentric mounting may also be provided with the motor similarly moving eccentrically with the stub axle.

The control compartment 22 is defined in part by the inner plates 26a, 27a of the upstanding members 26, 27. At the rear, the control compartment is defined in part by the front wall 34b of the engine compartment 34.

The inner plates 26a, 27a which in substance define part of the control compartment are themselves integral continuations of the outer walls 18a, 19a of the hereinbefore described side members 18, 19. In the present example the inner plates 26a, 27a, and a contoured base 28a are made by bending a single plate to the profile shown in FIG. 3. If desired the control compartment may be integrated with other structural members of the body by welding instead of being formed from a single plate.

Thus it will be seen that the main structural parts of the control compartment which provide the walls thereof are formed integrally with other structural elements of the vehicle and in particular the side members 18, 19 which provide the loop cases and the upstanding members 26, 27 which carry the boom assembly pivots and thus the control compartment is integrated with the remainder of the machine and it, together with the support 28 and posts 29, provide the vehicle with a high ability to withstand forces exerted thereon during roll-over conditions.

Referring now to FIGS. 7–13 of the drawings a remote control vehicle 210 comprises a body 211 having a front end 212 and a rear end 213.

The body 211 is provided with first ground engageable propulsion means 214 comprising a front ground engageable wheel 215 and a rear ground engageable wheel 216 and, on the opposite side of the body, a second ground engageable propulsion means 217 similarly comprising a rear wheel 218 and a front wheel 219. The vehicle 210 may be propelled in a straight line forwardly or rearwardly by driving all four wheels at the same speed, or, to steer the vehicle, by driving the wheels 215, 216 of the first ground engageable propulsion means 214 at a different speed and/or direction than the wheels 217, 218 of the second ground engageable means 219. Such a remote control vehicle has a high degree of manoeuvrability and to facilitate skid steering and in particular, for example, the ability of the vehicle to turn about a central axis of the ground engageable propulsion means the wheel base is made, in the present example, slightly shorter than the track of the vehicle although, if desired, the wheel base may be the same or longer than the track if desired.

The wheels 215, 216 are carried on hubs 220, non-rotatably fixed to stub axles 221 are rotatably carried in stub axle housing members 222 by bearings 222a and which provide first drive members.

The wheels 218, 219 are carried on hubs 223, non-rotatably fixed to elongate axles 224 which are rotatably mounted in elongate tubular axle housings 225 by bearings 225a and provide second drive members.

Figure 10:
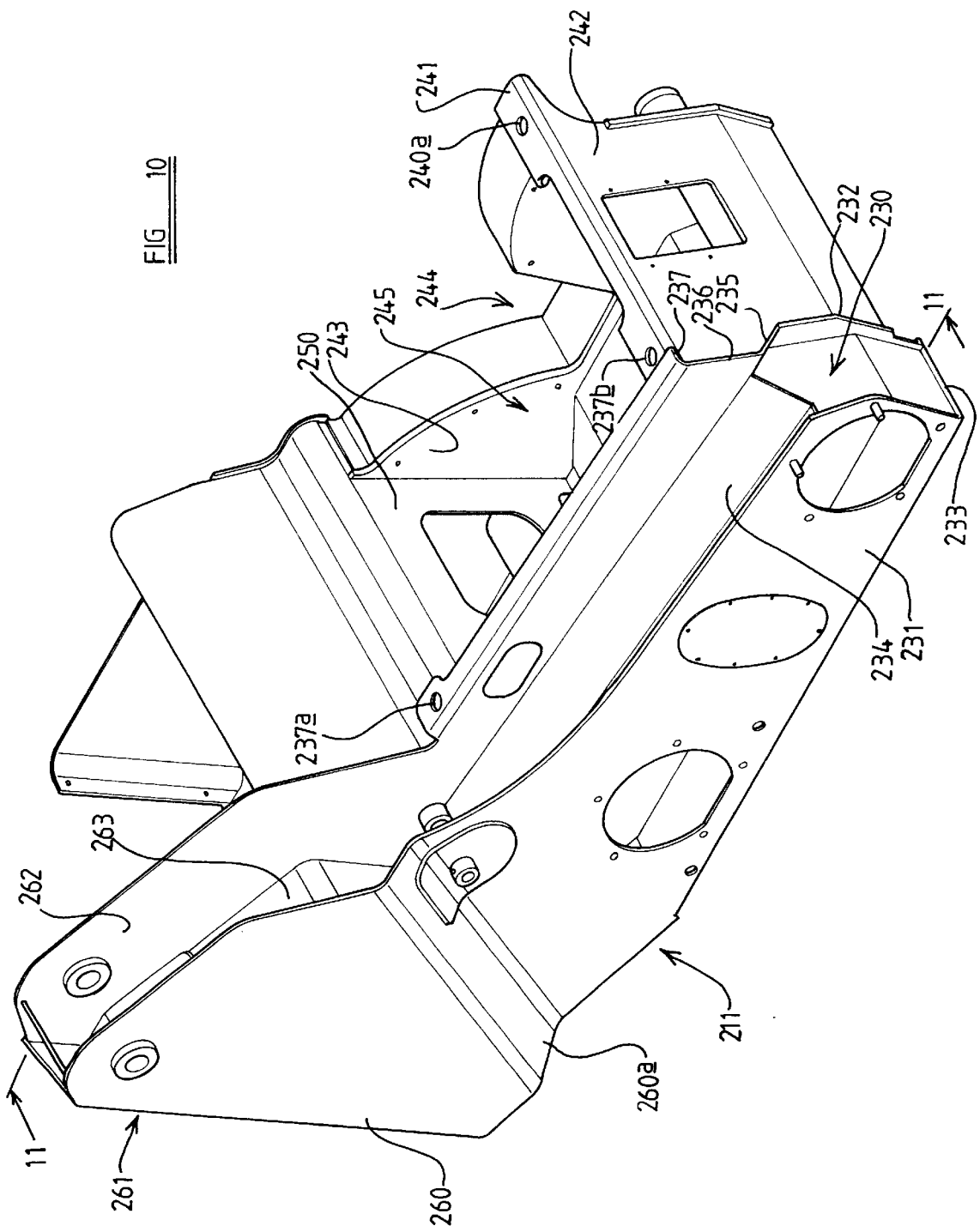
FIG. 10 is a perspective view of a body part of the vehicle of FIG. 7 but with parts omitted for clarity.
Figure 11:
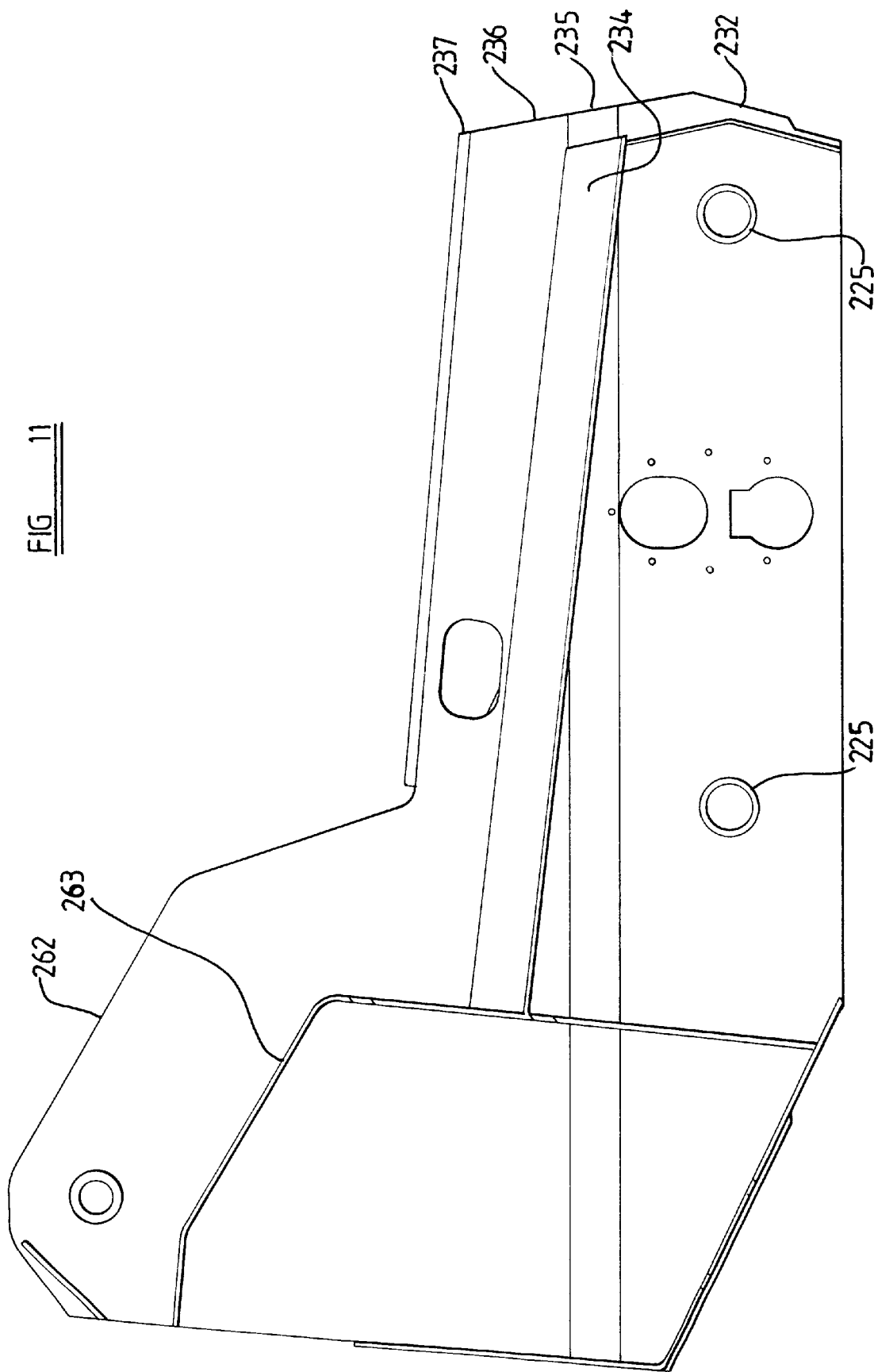
FIG. 11 is a section on the line 11—11 of FIG. 10.

Referring now particularly to FIGS. 10 to 12, the body 111 comprises, at one side, a single transmission case means 230 comprising a generally planar outer side wall 231 and a generally planar inner side wall 232. The side walls 231, 232 are connected together by a bottom wall 233 and an inclined top wall member 234 which is connected at its outer end to the outer wall 231 and at its inner upper end is connected to an inwardly and upwardly inclined further part 235 integral with of the inner wall 232. In this example the side walls are generally parallel but if desired they may not be.

An extension part 236 is integral with the further part 235 and projects upwardly and is provided with an inwardly directed flange 237 which provides a mounting 237a, for a rear member of a side frame 238 of a control compartment 239. Disposed within the control compartment 249 is a receiver 223 providing outputs for control of the vehicle all as described in connection with the first embodiment.

A front member of the side frame 238 and a front member of an opposite side frame 240 of the control compartment 239 are fastened at 237b and at 240a respectively to an inturned flange 241 of a front wall part 242 of the body which extends transversely across the body at the forward end 212 thereof.

A rear member of the frame 240 is mounted on a second transversely extending wall 250.

The frames 238 and 240 are provided with a support 246 for cameras and lights 223, 224 which may be provided as described in connection with the first embodiment.

The second transversely extending wall 250, is provided between the inner side wall 232 of the transmission case means 230 and the further and extension parts 235, 236 on the one side of the body and the opposite side wall 243 at a position disposed intermediate the front and rear ends 212, 213 of the body. It provides a bulk head between the control compartment 239 and the engine of the vehicle. The inner side wall 232 of the transmission case means and the further and extension parts 235, 236 extend rearwardly of the transverse wall 250 and together with an extension part 251 of the side wall 243, provide an engine compartment 253 behind the control compartment 239. The extension part 251 is parallel to the side wall 243 but is spaced outwardly thereof by a transversely extending wall 252 which provides a wheel arch 253. A front wheel arch 254 is provided by a further intermediate wall 255. The walls 252 and 255 are secured to the side wall 243 by screw threaded fasteners.

An extension part 260 of the outer side wall 231 of the transmission case means 230 provides one, outer, member of an upright or tower 261 whilst an extension part 262 of the inner wall 232 provides an inner side wall of the tower 261. The extension part 260 is parallel to the outer side wall 231 but is spaced outwardly thereof by an inclined part 260a which is integral with the wall 231 and the extension part 260. The tower 261 is reinforced by a transversely extending member 263 and is further reinforced by members 264 and 265. Provided adjacent an upper end of the tower 261 is a pair of mounting bushes 266 by which a single lift arm assembly 267 is pivotally mounted, at its inner end, to the body 210 adjacent the rear end 213 thereof The lift arm assembly 267 is disposed adjacent one side 268 of the vehicle so as to be disposed on one side of a longitudinal axis of the vehicle centrally disposed between the ground engageable wheels 15, 16. The lift arm assembly 267 has receiving means, not shown, for a pivot pin 270, which is received therein and in said bushes 266 to provide a pivot for the lift arm assembly 267.

At its forward end the lift arm assembly 267 has an implement carrying member 271 which projects from a outer or front end 272 of the lift arm assembly 267 and extends transversely across the front end of the body 212 forwardly thereof and has an implement 273 carried thereby so as to be disposed forward of the front end 212 of the body 211. In the present example, the implement 273 is as described in connection with the first embodiment as are the alternatives which may be provided. In addition the manner in which first and second auxiliary devices may be provided may be as described in connection with the first embodiment.

The lift arm assembly 267 is formed as a generally square section tubular fabrication and comprises a major part 274 which extends generally rectilinearly from the inner end 269a of the lift arm assembly towards the outer end 272 and a minor part 274a which extends generally downwardly and forwardly relative to the main part 274 to terminate at the outer end 272 and provided with the implement carrying means 271.

A hydraulic lift ram 275, herein referred to as a first motor, is pivotally connected between a reinforced part 276 of the outer wall 231 of the transmission case means 230, where it merges with the outer wall 260 of the tower, and a bracket 177 welded to the lift arm assembly 167 in the region of the junction between the parts 274 and 275. The pivotal connection of the lift ram 275 at each end comprises a pivot pin 278 which is mounted in pivot bushes welded in openings provided in the respective plates and bracket and extending through apertures provided in the ram at opposite ends thereof. In addition a crowd ram 280, herein referred to as a second motor, is provided between a pivot pin 281 disposed in cantilever on the lift arm assembly 269 and pivot pin mounting apertures 281a of the implement carrier 271.

Figure 9:
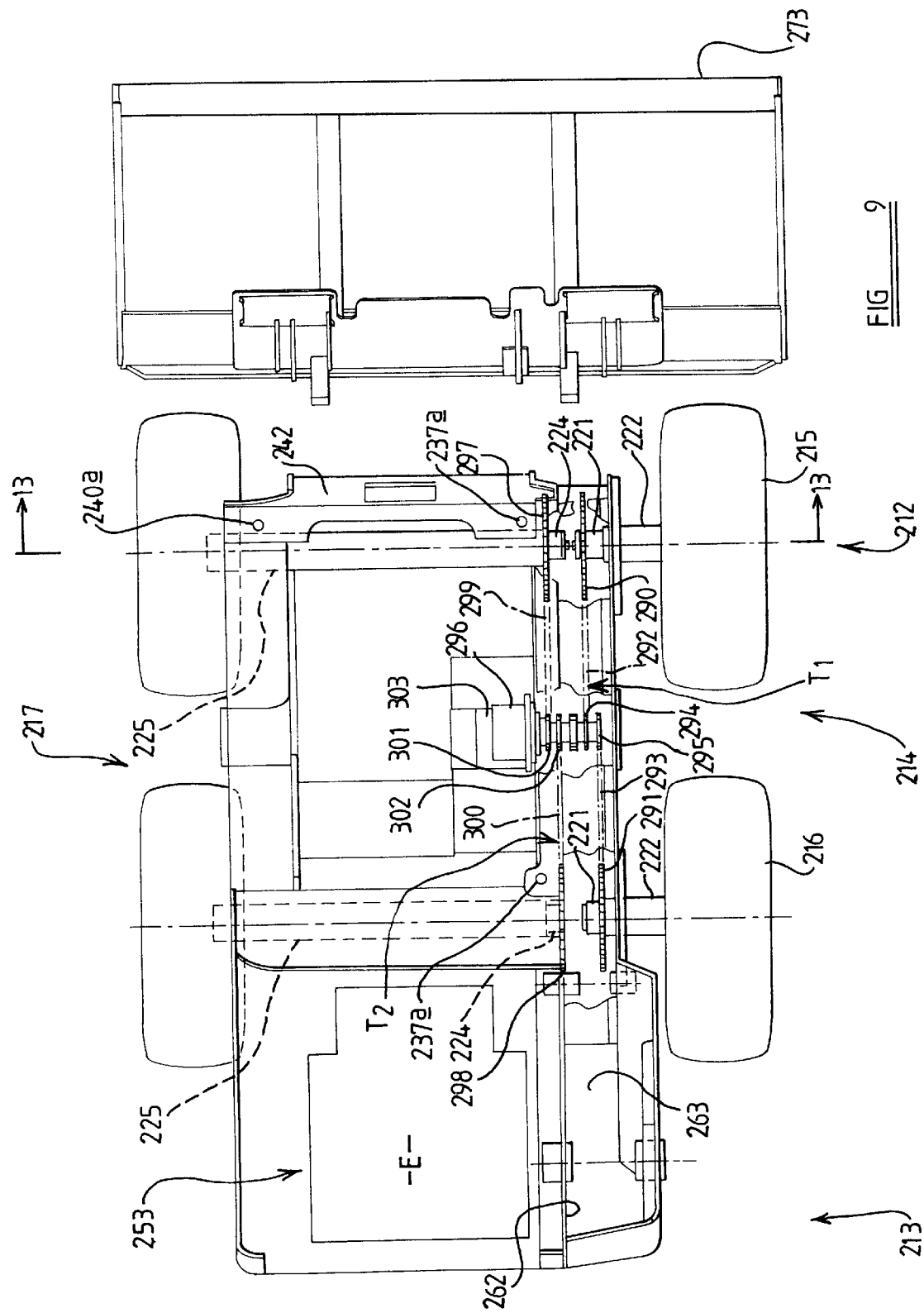
FIG. 9 is a plan view of the vehicle of FIG. 7 but with parts omitted for clarity.
Figure 13:
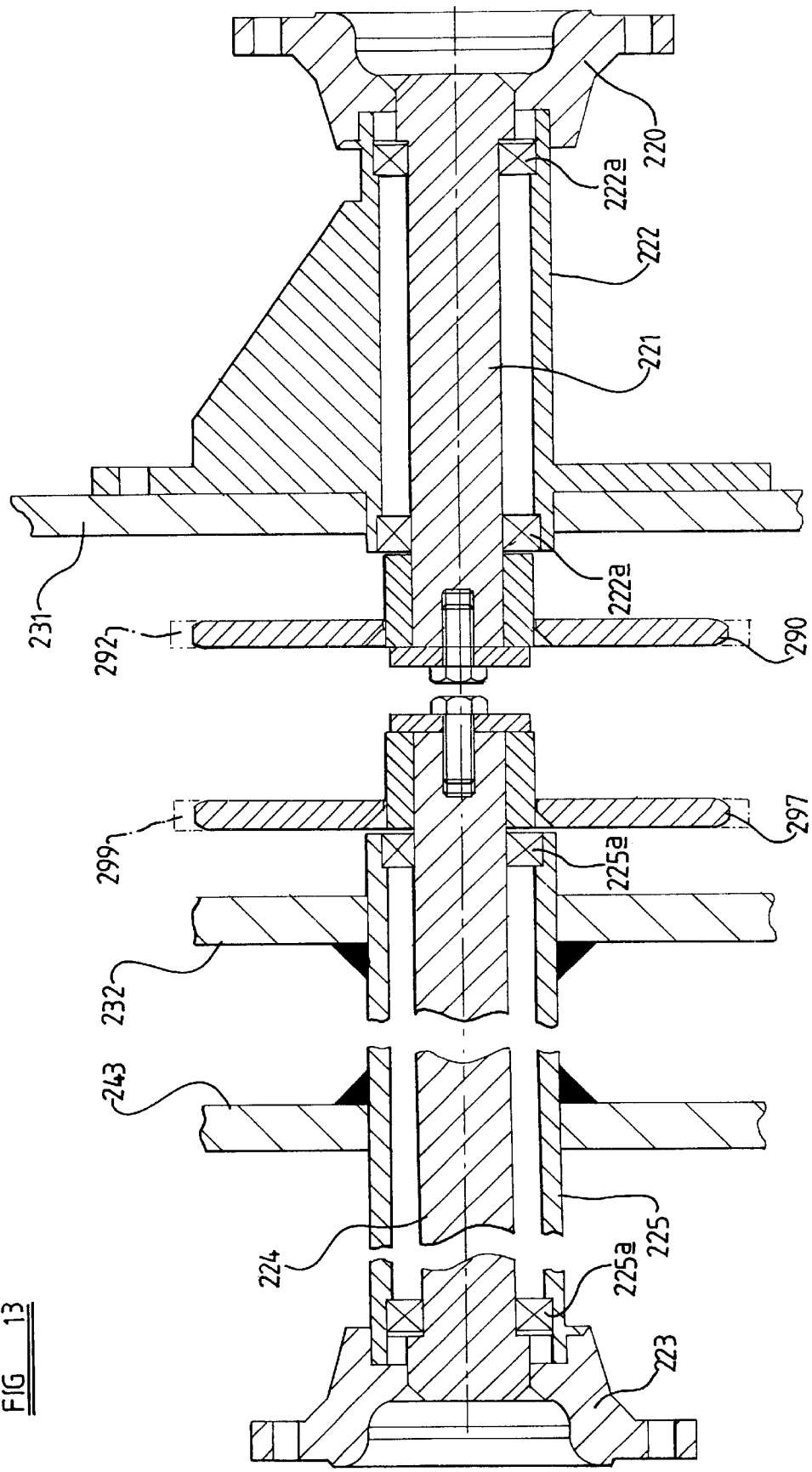
FIG. 13 is a fragmentary section on the line 13—13 of FIG. 9 with parts omitted for clarity.
Figure 14:
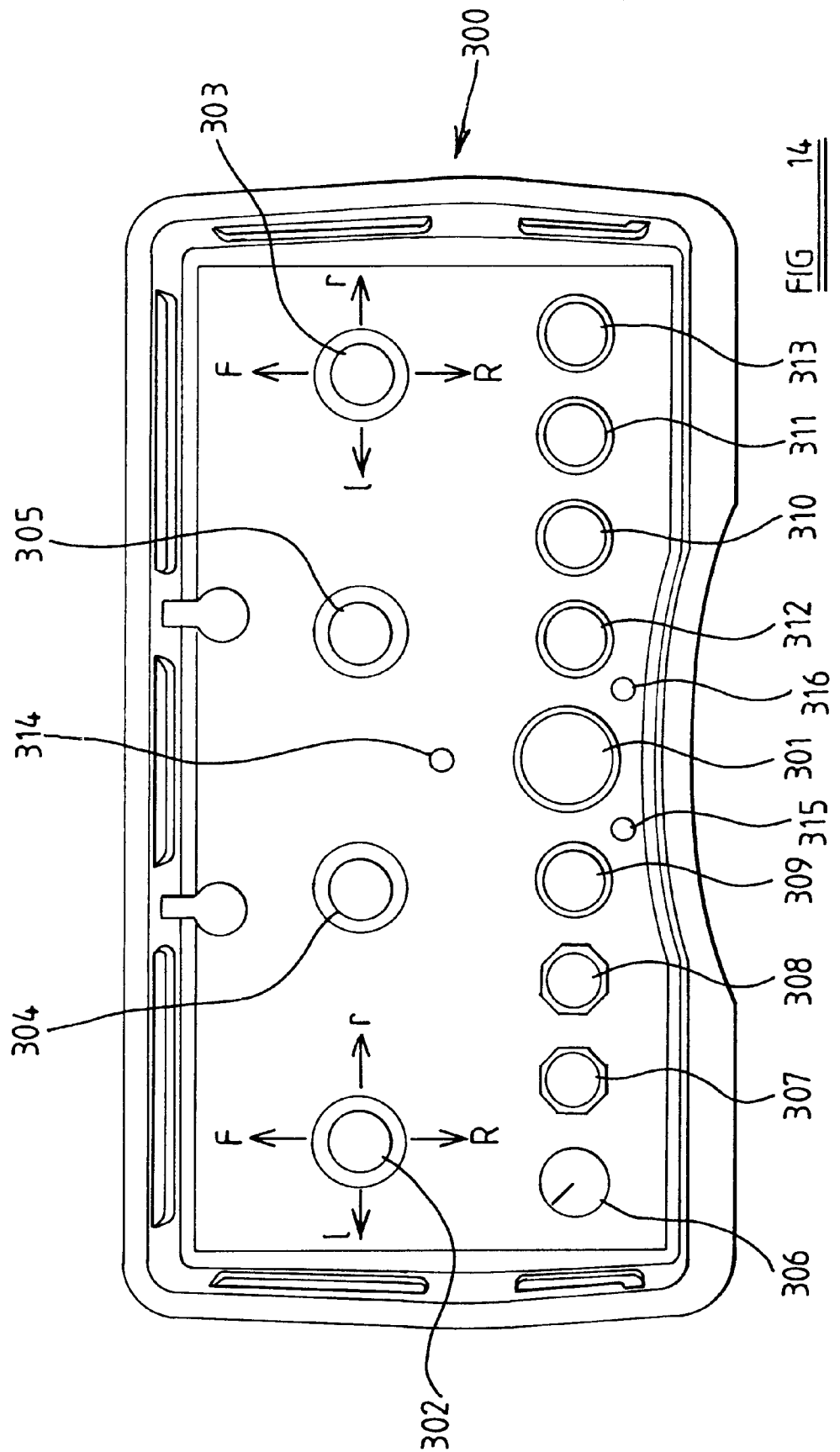
FIG. 14 is a diagrammatic plan view of a remote controller for use with the vehicle of the first or second embodiment.

Referring now to FIGS. 9 and 13, the transmission case means 230 has therein first and second transmission means T1, T2 by which the first and second propulsion means 214, 217 are driven. Each drive member 221 is provided with first, front and rear, driven wheels 290, 291 respectively, rigidly connected thereto. The driven wheels 290, 291 are connected, by drive loops 292, 293 respectively, to respective drive elements 294, 295 carried on an output shaft of a first hydro-static drive motor 296.

The drive members 224 are similarly provided with second, front and rear, driven wheels 297, 298 connected by respective drive loops 299, 300 to respective drive elements 301, 302 carried on an output shaft of a second hydro-static drive motor 303 disposed below the motor 296. Of course, if desired, the motor 303 may be disposed above the motor 296.

If desired the drive elements 294, 295, 301, 302 may be provided on a shaft separate from the motor output shaft but driven thereby.

The first transmission means T1 comprises the first drive member 221, drive wheels 290, 291, drive loops 292, 293 and drive elements 294, 295. The second transmission means T2 comprises the second drive members 224, drive wheels 297, 298, drive loops 299, 300 and drive elements 201, 202.

In the present example, the driven wheels and drive elements comprise sprockets around which drive loops comprises roller chains are entrained. If desired, however, the drive loops may comprise other means such as toothed or untoothed belts in which case means they would be entrained around suitably configured co-operating drive elements and driven wheels.

The stub axle housings 222 are arranged so that each is bolted to the casing 230 so that it may be rotated and the axis of rotation of the stub shaft being eccentric to the axis of rotation of the housing so that the tension of the loops 292, 293 may be adjusted.

The tension of the loops 299, 300 is adjusted by moving the drive motor 303 associated therewith vertically up and down relative to the inner member 232 of the loop case means.

If desired, instead of each ground engageable propulsion means comprising two ground engageable wheels each ground engageable propulsion means may comprise an endless track engaged around a pair of guide wheels. At least one of the guide wheels may be carried by hubs 220 or 223 or members similar thereto and have an endless track entrained there around. In this case means, if desired, only one of the guide means may be driven by a guide wheel 290, 291 or 297, 298 from the associated drive element 294, 295 or 301, 302.

Further alternatively, in either case, if desired the drive members 221, 224 may be driven by means other than drive loops, for example, by gears or a combination of gears and drive shafts from an associated motor.

An engine, indicated generally at E in FIG. 9 is provided in the engine compartment 250 in conventional manner and connected to one or more hydraulic pumps which are operable by the control means to drive the motors 296, 303 described hereinbefore in conventional manner in connection with the first embodiment.

The transmission case means described hereinbefore has comprised a single transmission case having only two spaced parallel side walls between which the first and second transmission means are disposed. However, if desired, the transmission case means may comprise two separate transmission cases each having a pair of spaced, preferably parallel, side walls between each pair of which only one of said transmission means is disposed. The separate transmission cases may be constructed as desired and may be integral with each other or connected together as desired. Further alternatively the transmission case means may comprise two spaced, preferably parallel, side walls with an intermediate wall disposed there between to form two separate compartments in each of which one of said first or second transmission means is disposed. If desired other configuration of transmission case means may be provided.

In the above described examples the components of the vehicle are conventionally joined together by welding, but if desired, may be joined together by other means such as fasteners. Where components have been described hereinbefore as being integral with each other they may, if desired, be made from discrete elements which are joined together by welding or in any other suitable manner.

Although in the above described example and in the first embodiment the lift arm assembly and the transmission case means have been described as being provided on the right hand side of the vehicle when facing towards the front of the vehicle, if desired, in either embodiment, the configuration of the vehicle may be reversed so that the lift arm assembly and the transmission case means are provided on the left hand side of the vehicle when facing forwardly and a cut out, corresponding to the cut out 44, provided on the right hand side of the vehicle.

The remote control arrangement for each of the two embodiments described hereinbefore is the same and will now be described in more detail.

The receiver 23, 223, of the first or second embodiment respectively, is adapted to receive a radio signal from a remote control unit 300. The remote control unit 300 is provided with an aerial, not shown, for transmitting a radio signal to the receiver 23, 223.

The remote controller 300 has an emergency stop 301, a left hand joystick 302, a right hand joystick 303, a first auxiliary joystick 304 and a second auxiliary joystick 305. The unit 300 also an engine speed control knob 306, a park brake switch 307, a control 308 for a water jet or other fire control medium, a frequency change control 309, a glow plug control 310, an engine start control 311 and a lock 312 for the glow control and the start control and an on/off control 313.

In addition the controller 300 has a warning indicator 314, a battery low indicator 315 and an operation indicator 316.

The left hand and right hand joysticks may be moved forwardly (F) or rearwardly (R) to achieve proportional control of the vehicle as hereinafter described or may be moved to the left (l) or the right (r).

The left hand joystick movement to the left or the right controls proportional lifting and lowering of the boom respectively whilst the right hand joystick when moved to the left or the right causes proportional crowding movement of the implement or dumping movement of the implement respectively.

The auxiliary joysticks 304, 305 can, in the present embodiment, only be moved in the forward or the reverse direction to operate the auxiliary devices proportionately as hereinafter described.

The other controls are operated by the by moving switches or pressing buttons to achieve the desired function described hereinbefore.

Figure 15:
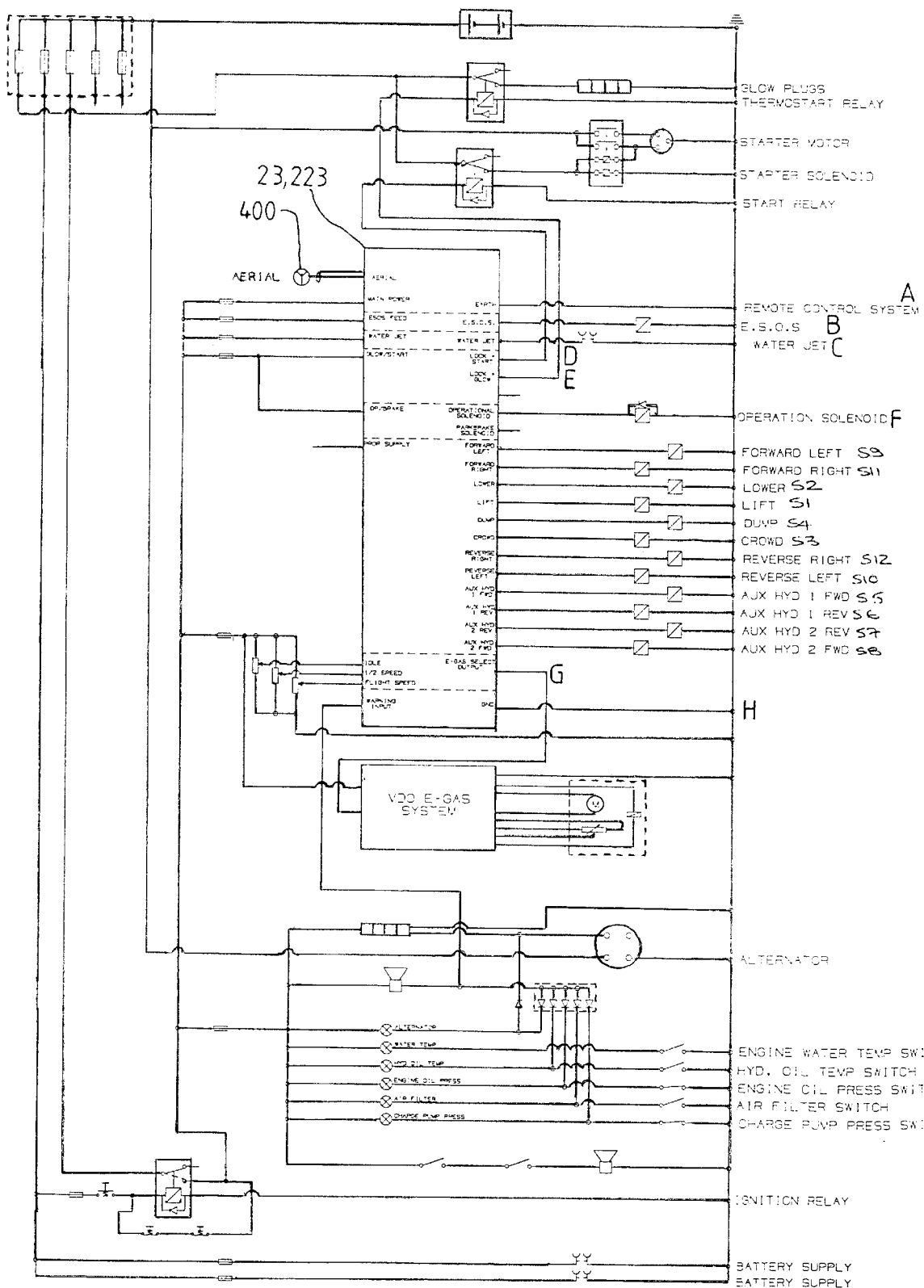
FIG. 15 is an electrical circuit diagram of the vehicle of the first or the second embodiment.

Referring to FIG. 15 the electromagnetic signal, in the radio frequency range, from the remote control unit 300 is received by an aerial 400 of the receiver 23, 223. The receiver is provided with a power from a source on the vehicle as illustrated by the circuit diagram of FIG. 15.

The receiver 23, 223 has a forward left output $S_9$ and a reverse left output $S_{10}$ which are controlled by forward and reverse movement of the left hand joystick 304. There is a forward right output $S_{11}$ and a reverse right output $S_{12}$ which are controlled by forward and reverse movement of the right hand joystick 303. Outputs $S_1$ and $S_2$ cause lift and lowering movement of the boom respectively and are controlled by movement of the right hand joystick 302 to the left or right respectively. Outputs $S_3$ and $S_4$ cause crowding movement and dumping movement of the implement as a result of left hand or right hand movement of the right hand joystick 303. Outputs $S_5$ and $S_6$ cause operation of the first auxiliary device as a result of forward or reverse movement of the first auxiliary joystick 304 whilst outputs $S_7$ and $S_8$ cause operation of the second auxiliary device as a result of reverse and forward movement respectively of the second auxiliary joystick 305.

Outputs A–H provide control of the remote control system, E.S.O.S. water jet, starting of the engine glow plug operation, operation of the brake, operation of the VDOE-gas system, warning system input respectively. Other aspects of control will be clear from FIG. 15.

Figure 16:
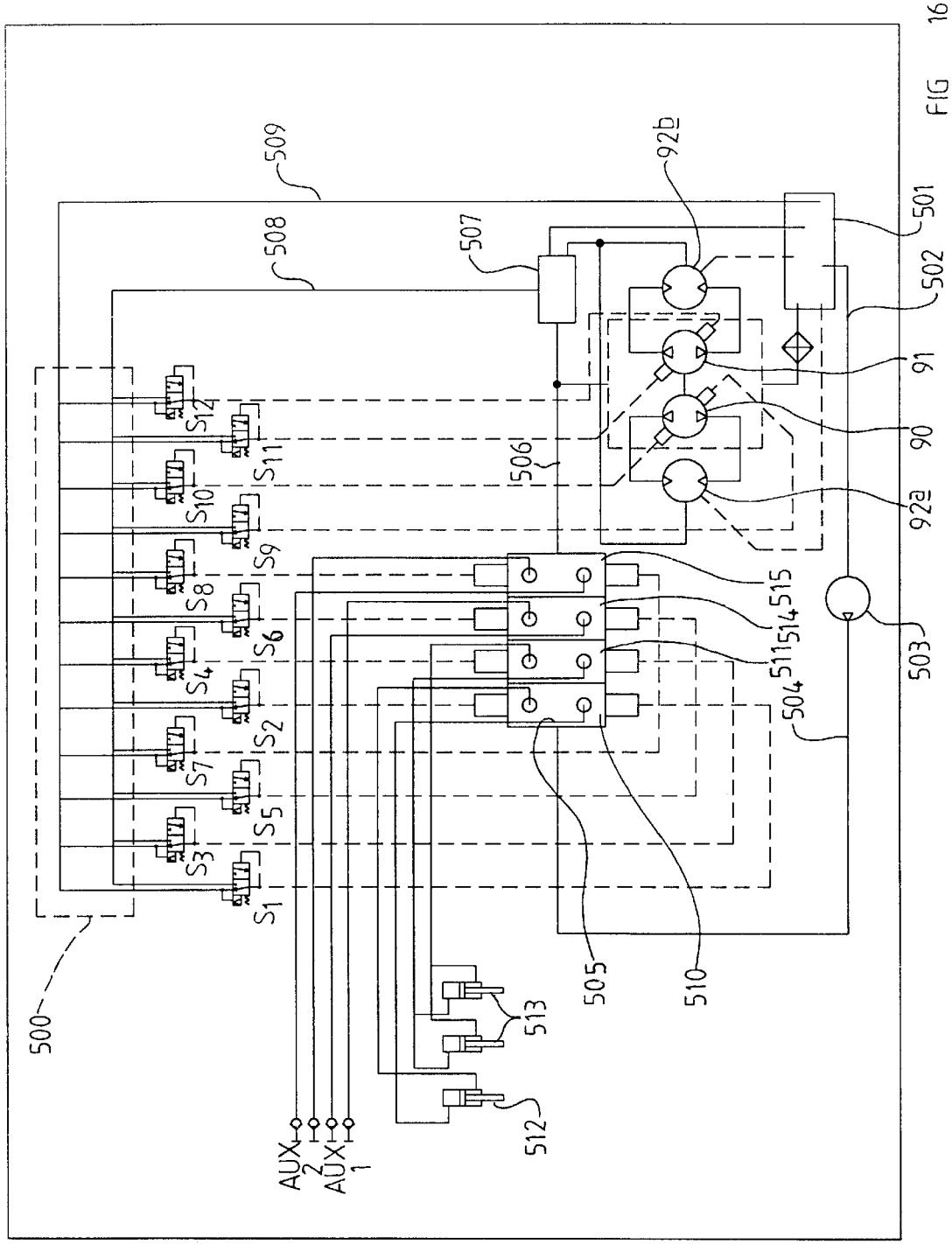
FIG. 16 is a hydraulic circuit diagram of the vehicle of the first or the second embodiment.

Referring now to FIG. 16. Mounted within the control compartment 22, 149 is manifold block to which hydraulic fluid is supplied with hydraulic fluid from a tank 501 and line 502 by a service pump 503 which feeds fluid on line 504 to a valve block 505 and then on line 506 to a pressure reducing valve 507 and then on line 508 to the manifold 500. Return flow to the reservoir 501 is on line 509.

The outputs $S_1$–$S_{12}$ are connected to proportional solenoid valves $S_1$–$S_{12}$ respectively also mounted within the control comnpartment. The outlets of hydraulic fluid from the valves $S_1$ and $S_2$ are fed to a first hydraulically operated valve 510 outputs of which are connected to the lift ram 512. The outlet of the valves $S_3$ and $S_4$ are connected to a second valve 511 outputs of which are fed to the crowd rams 513. Solenoids $S_5$ and $S_6$ are fed to valve 514, outputs of which are fed to a first auxiliary device whilst outputs $S_7$ and $S_8$ are fed to a valve 515, outputs of which are fed to a second auxiliary device.

Outputs of valves $S_9$ and $S_{10}$ are fed to control the angle of the swash plate of pump 90 to cause forward or reverse operation thereof respectively whilst outputs $S_{11}$ and $S_{12}$ are fed to control the angle of the swash plate of the pump 91 to cause forward or reverse movement of the motor 92 associated therewith accordingly.

In addition to the emergency stop 301 provided on the remote controller 300, the vehicle itself is provided with two emergency stop switches 301a, 301b, preferably in the form of push buttons disposed on opposite sides of the machine in any conveniently accessible position. Accordingly the vehicle can be stopped in an emergency either remotely by operation of the stop 301 or manually by engaging one or other of the stop controls 301a, 301b. In this embodiment the stop controls disable the electrics of the machine and such disabling cuts off the fuel supply and therefore stops the engine.

Disposed within a housing, such as a die-cast box, is a display of vehicle critical information such as total vehicle hours, alternator output below a predetermined value, engine water temperature above a predetermined value, transmission oil temperature above a predetermined value, engine oil pressure below a predetermined value, transmission/charge pump oil pressure below a predetermined value, air transmission by engine air filter below a predetermined value.

The vehicle may be provided with a transmitter of electromagnetic radiation in the radio frequency range to transmit a signal dependent upon at least one of the above mentioned vehicle critical information, preferably all the above information except the first mentioned, or other vehicle critical information. Such a signal is fed to a remote warning device. In the present example, the remote warning device is the warning indicator 314.

In order to adapt the embodiments described hereinbefore specifically for use in high temperature environments all the hydraulic hoses are provided with an appropriate fire resistant jacket. In addition auxiliary 12 volt sockets are provided on the vehicle for connection, for example, to C.C. TV cameras, auxiliary pipework is provided for necessary supply of firefighting fluid from a reservoir to the dispensing means. A rear door guard is provided. Means are provided as described hereinbefore for mounting the camera(s), preferably by means of rails. The vehicle is provided with fire resistant tires which do not rely on pneumatic inflation such as solid rubber or rubber-like tires and has a quick hitch device. All the electrics of the vehicle are arranged so as to be capable of resisting a relatively high temperature for example 135° C. No plastic components are used on the vehicle so for example a metal fan cowl is used in the metal header tank.

In both embodiments of the invention, a reservoir for water or other fire fighting medium, a nozzle which preferably provides a spray of atomised water and a pump to feed water or other fire fighting medium from the reservoir to the nozzle are provided as a self-contained fire fighting attachment which is adapted to be carried by the boom of the respective vehicle. Preferably the fire fighting attachment is carried by said carrying means and therefore the nozzle can be directed as desired onto a fire by virtue of up and down movement being achieved by the herein described crowd ram and lateral movement being achieved by a desired one of the first or second auxiliary devices.

Alternatively, if desired, in both embodiments of the invention a reservoir for water or other fire fighting medium may be provided at a suitable location such as in the region below the support 28, 246 respectively. If desired the region below the respective support may be protected by suitable means such as wire mesh provided as desired such as illustrated on all sides of the region as shown at 30 in FIG. 1. A pump is provided, at a suitable location on the vehicle, to feed the firefighting medium to a dispensing means such as a suitably disposed nozzle which provides a spray of atomised water. Further alternatively, if desired, the nozzle may be provided as a firefighting attachment to be carried by the boom of the vehicle and at least one of the pump and reservoir may be disposed at a position remote from the nozzle on the body of the machine.

In the present examples the receiver is mounted on the front bulkhead of the machine beneath a service cover which provides the roof of the control compartment. The antenna therefore is mounted on the support 28, 246 towards the rear. The response of the joysticks of the remote control unit may be preset by using a teaching function.

The protection provided to the hydraulic hoses is preferably by fitting a device known as a "Fyre Jacket" which is a thick-walled braided glass fibre ceiling with a flame retardant silicon rubber external coating. The layer of glass fibre ensures thermal protection and provides a barrier against flame and molten metal splashes.

Wires of the vehicle are protected by providing insulation which has a temperature rating of 135° C. and by providing a covering which is rated up to 150° C. The wiring harness is fully protected from dirt and dust ingress.

The engine speed is controlled by the remote control handset. Preferably the engine speed is controlled by a VDO e-gas system. The control ECU and potentiometers to govern the engine speed are located in the electrical control box.

Although in the example described hereinbefore the vehicles have been described as intended for use for firefighting, if desired the invention may be applied to other applications where remote control vehicle is required.

The vehicle may be made of any suitable material including, for example, stainless steel of at least the main components of the body of the vehicle.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

What is claimed is:

1. A remote control fire-fighting vehicle comprising a body having a front end and a rear end and provided with first and second ground engageable propulsion means respectively disposed on opposite sides of the vehicle and in which the first and second propulsion means are driven by first and second transmission means respectively to permit the vehicle to be propelled and steered by driving the propulsion means on one side of the vehicle independently from the propulsion means on the other side of the vehicle, a boom assembly having carrying means for carrying an implement comprising at least one of a material handling implement and a fire-fighting attachment on the boom assembly, the boom assembly being mounted on the body for lifting movement between a raised position and a lowered position by a lifting means and wherein the ground engageable propulsion means and the lifting means of the boom assembly are operable by a receiver, of an electromagnetic signal, wherein each transmission means comprises a hydrostatic motor driven by a respective hydrostatic pump, the output of each pump being controlled by an electrical signal supplied by said receiver in response to said electromagnetic signal.

2. A vehicle according to claim 1 wherein each pump is provided with at least one hydraulic servo mechanism for adjustment of the output of said pump, the servo mechanism being operable by said electrical signal.

3. A vehicle according to claim 2 wherein the servo mechanism comprises at least one hydraulically operated motor means to adjust the output of said pump.

4. A vehicle according to claim 3 wherein supply of fluid to the second motor means is controlled by an electrical signal supplied by said receiver in response to said electromagnetic signal.

5. A vehicle according to claim 1 wherein the lifting means of the boom assembly comprises a first motor means disposed between the boom and the body, supply of fluid to the first motor means being controlled by an electrical signal supplied by said receiver in response to said electromagnetic signal.

6. A vehicle according to claim 5 wherein the implement is movable relative to the boom assembly by a second hydraulic motor means.

7. A vehicle according to claim 5 wherein the second hydraulic motor means comprises a crowd ram connected between the boom assembly and the carrying means for pivotal movement of the carrying means relative to the boom assembly.

8. A vehicle according to claim 1 wherein the vehicle is provided with a first auxiliary device operable by a third motor means.

9. A vehicle according to claim 8 wherein supply of fluid to third motor means is controlled by an electrical signal supplied by said receiver in response to said electromagnetic signal.

10. A vehicle according to claim 8 wherein the first auxiliary device comprises a clamping means operable to hold a load on said implement.

11. A vehicle according to claim 1 wherein the vehicle is provided with a second auxiliary device operable by a fourth motor means.

12. A vehicle according to claim 11 wherein supply of fluid to the fourth motor means is controlled by an electrical signal supplied by said receiver in response to said electromagnetic signal.

13. A vehicle according to claim 1 wherein the vehicle has a control compartment which is disposed within a housing.

14. A vehicle according to claim 13 wherein the control compartment is enclosed by metal walls, roof and floor with connection therethrough for at least one component disposed within the control compartment.

15. A vehicle according to claim 1 wherein the vehicle has means to dispense water or other fire fighting medium therefrom.

16. A vehicle according to claim 15 wherein said means comprises a nozzle for said medium which may be controlled by an electrical signal supplied by said receiver in response to said electromagnetic signal.

17. A vehicle according to claim 16 wherein the vehicle has a reservoir to contain water fire fighting medium for dispensing by said dispensing means.

18. A vehicle according to claim 17 wherein the vehicle has a pump to feed medium from the reservoir to be dispensed from said dispensing means under pressure.

19. A vehicle according to claim 1 wherein said fire fighting attachment is carried by said carrying means.

20. A vehicle according to claim 1 wherein the vehicle is provided with at least one of an operator's seat, operator control for propelling and steering the vehicle, operator control for lifting movement of the boom assembly and operator control for operation of at least one of a first auxiliary device and a second auxiliary device.

21. A vehicle according to claim 1 wherein the boom assembly has said carrying means at an outer end thereof and an inner end of the boom assembly is mounted on the body at or adjacent the rear end of the body and in said lowered position the boom assembly extends forwards from said inner end so that the implement is disposed forward of the front end of the body.

22. A vehicle according to claim 21 wherein the boom assembly is disposed on one side of a longitudinal axis of the vehicle which axis is disposed midway between said first and second ground engageable propulsion means.

23. A vehicle according to claim 1 wherein the vehicle is provided with a condition sensor means, and the condition sensor means providing a signal to a transmitter, of an electromagnetic signal, provided on the body and wherein the electromagnetic signal is transmitted by the transmitter on the body to a receiver disposed at a location remote from said vehicle.

24. A vehicle according to claim 1 wherein the vehicle has at least one camera to provide a signal to a transmitting means, provided on the vehicle, for transmission of an electromagnetic signal to a receiving means disposed at a location remote from the vehicle for display of an image provided by the camera.

25. A vehicle according to claim 1 wherein the boom assembly comprises a generally "L" shaped member comprising a single lift arm assembly which extends forwardly along one side only of the vehicle and a pivot member which is rigid with the lift arm assembly, which projects from the inner end of the lift arm assembly on one side thereof and extends transversely across the body from one side of the lift arm assembly to a position adjacent the opposite side of the body, the pivot member being pivotally mounted on the body by pivotal mounting means which are spaced apart transversely of the body and are adjacent an upper rear end part of the body on opposite sides of the body.

26. A vehicle according to claim 25 wherein the body comprises a pair of transversely spaced side members on which said ground engageable propulsion means are mounted, and the pivotal mounting means is supported by a pair of transversely spaced upright members disposed adjacent the rear of the body and which extend upwardly from said side members at the rear of the control region.

27. A vehicle according to claim 26 wherein the side members comprise loop case compartments comprising a transversely inner wall and a transversely outer wall joined by top and bottom walls and end walls and a member providing one of said walls is provided integrally with the member which provides at least part of one plate of each upstanding member.

28. A vehicle according to claim 1 wherein the body is provided with an engine, two pairs of ground engageable propulsion wheels disposed on opposite side of the body, an hydraulic drive means including first and second variable displacement pumps driven by the engine and operatively connected to first and second hydraulic motors disposed on opposite sides of the body, each pump being drivably connected on two ground engageable propulsion wheels of an associated one of said pair of wheels on the associated side of the body by first and second endless loops each of which is engaged with a driving wheel driven by the pump and with a driven wheel connected to an associated one of the ground engageable wheels of said pair and propulsion control means whereby the hydraulic drive means can drive the pair of wheels on one side of the vehicle at the same or a different speed and/or direction from the pair of wheels on the other side of the vehicle to propel and steer the vehicle.

29. A vehicle according to claim 28 wherein the ground engageable propulsion wheels are disposed on opposite sides of the body, each propulsion wheel being carried on an outer end of a stub axle which is housed, so as to be rotatable about an axis of rotation, in a stub axle housing member mounted on the body and the body is provided with a longitudinally extending loop case compartment, one on each side of the vehicle, each loop case compartment having a transversely inner wall and a transversely outer wall joined by top and bottom walls and end walls, said stub axle housing member or members being mounted on the outer wall with said driven wheels or wheels disposed within said compartment.

30. A vehicle according to claim 29 wherein two stub axle housing members are provided on each side of the vehicle and each of said housing members are mounted on said outer wall with said driven wheels disposed within the compartment with said driving wheels disposed within the compartment therebetween with said loops engaged with respective driving and driven wheels.

31. A vehicle according to claim 1 wherein the boom assembly comprises a single lift arm assembly which extends forwards along one side only of the vehicle and an inner end of the lift arm assembly is pivotally mounted on the body by pivotal mounting means disposed on said one side only of the vehicle.

32. A vehicle according to claim 31 wherein the vehicle comprises a transmission case means, disposed on one side of the vehicle, having therein said first and second transmission means.

33. A vehicle according to claim 32 wherein the first transmission means comprises a first drive member projecting from one side of the transmission case means and drivingly connected to the first ground engageable propulsion means and the second transmission means comprises a second drive member projecting from the opposite side of the transmission case means and extending transversely across the vehicle so as to be drivingly connected to the ground engageable propulsion means.

34. A vehicle according to claim 32 wherein the transmission case means comprises a pair of spaced, preferably parallel, side walls between which said first and second transmission means are disposed.

35. A vehicle according to claim 34 wherein the side walls are provided with extension parts which comprise side walls of an upright disposed on said one side only of the vehicle and providing in an upward region thereof, said pivotal mounting means for the boom assembly.

36. A vehicle according to claim 1 wherein the remote control unit has a left hand joystick and a right hand joystick to provide propulsion control of the vehicle.

37. A vehicle according to claim 36 wherein the remote control unit is provided with at least one auxiliary joystick arranged to provide operation of at least one of the first auxiliary and second auxiliary.

* * * * *